(12) United States Patent
Chang et al.

(10) Patent No.: US 12,411,317 B2
(45) Date of Patent: Sep. 9, 2025

(54) LENS ASSEMBLY

(71) Applicants: Sintai Optical (Shenzhen) Co., Ltd., ShenZhen (CN); Asia Optical Co., Inc., Taichung (TW)

(72) Inventors: An-Kai Chang, Taichung (TW); Wen-Chieh Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 794 days.

(21) Appl. No.: 17/665,659

(22) Filed: Feb. 7, 2022

(65) Prior Publication Data
US 2022/0276469 A1    Sep. 1, 2022

(30) Foreign Application Priority Data

Feb. 26, 2021  (CN) .......................... 202110218069.1
Apr. 29, 2021  (CN) .......................... 202110472094.2

(51) Int. Cl.
*G02B 13/00*    (2006.01)
*G02B 9/60*    (2006.01)

(52) U.S. Cl.
CPC ........... *G02B 13/0045* (2013.01); *G02B 9/60* (2013.01)

(58) Field of Classification Search
CPC .. G02B 13/04; G02B 13/001; G02B 13/0045; G02B 9/64; G02B 9/60
See application file for complete search history.

(56) References Cited

U.S. PATENT DOCUMENTS

| 7,480,105 | B2 | 1/2009 | Mori |
| 7,746,572 | B2 | 6/2010 | Asami |
| 9,323,027 | B2 | 4/2016 | Ahn et al. |
| 9,791,673 | B2 | 10/2017 | Tang et al. |
| 11,714,261 | B2 | 8/2023 | Liang |
| 2001/0024332 | A1* | 9/2001 | Mori ...................... G02B 13/04 359/755 |
| 2004/0125469 | A1 | 7/2004 | Miyano |

(Continued)

FOREIGN PATENT DOCUMENTS

| CN | 101051110 A | 10/2007 |
| CN | 101373260 A | 2/2009 |

(Continued)

OTHER PUBLICATIONS

"Gross et al., Handbook of Optical Systems, 2007, p. 378" (Year: 2007).*

*Primary Examiner* — George G. King
*Assistant Examiner* — Anna Smith
(74) *Attorney, Agent, or Firm* — McClure, Qualey & Rodack, LLP

(57) ABSTRACT

A lens assembly includes a first lens, a second lens, a third lens, a fourth lens, and a fifth lens. The first lens is a meniscus lens with negative refractive power. The second lens is with positive refractive power and includes a convex surface facing an image side. The third lens is a meniscus lens with positive refractive power. The fourth lens is with positive refractive power. The fifth lens is with refractive power and includes a convex surface facing an object side. The first lens, the second lens, the third lens, the fourth lens, and the fifth lens are arranged in order from an object side to the image side along an optical axis.

19 Claims, 27 Drawing Sheets

(56) References Cited

U.S. PATENT DOCUMENTS

| | | | | |
|---|---|---|---|---|
| 2016/0011403 | A1* | 1/2016 | Asami | G02B 9/62 |
| | | | | 359/740 |
| 2016/0147050 | A1* | 5/2016 | Fujikura | H04N 23/663 |
| | | | | 359/689 |
| 2016/0259150 | A1* | 9/2016 | Shin | G02B 9/62 |
| 2018/0045918 | A1 | 2/2018 | Seo et al. | |
| 2019/0369359 | A1* | 12/2019 | Son | H04N 23/55 |
| 2020/0400924 | A1* | 12/2020 | Xu | G02B 13/04 |

FOREIGN PATENT DOCUMENTS

| | | |
|---|---|---|
| CN | 104199176 A | 12/2014 |
| CN | 104749750 A | 7/2015 |
| CN | 106547074 A | 3/2017 |
| CN | 106707465 A | 5/2017 |
| CN | 106990510 A | 7/2017 |
| CN | 107065141 A | 8/2017 |
| CN | 107272165 A | 10/2017 |
| CN | 107797261 A | 3/2018 |
| CN | 108873270 A | 11/2018 |
| CN | 109313323 A | 2/2019 |
| CN | 211293433 U | 8/2020 |
| CN | 111812797 A | 10/2020 |
| CN | 112230371 A | 1/2021 |
| CN | 112462485 A | 3/2021 |
| CN | 112698498 A | 4/2021 |
| CN | 113031207 A | 6/2021 |
| JP | 2003344769 A | 12/2003 |
| JP | 2006276897 A | 10/2006 |
| JP | 2007279282 A | 10/2007 |
| JP | 2014102291 A | 6/2014 |
| TW | 201403166 A | 1/2014 |
| TW | M581700 U | 8/2019 |
| WO | 2013153792 A1 | 12/2015 |

\* cited by examiner

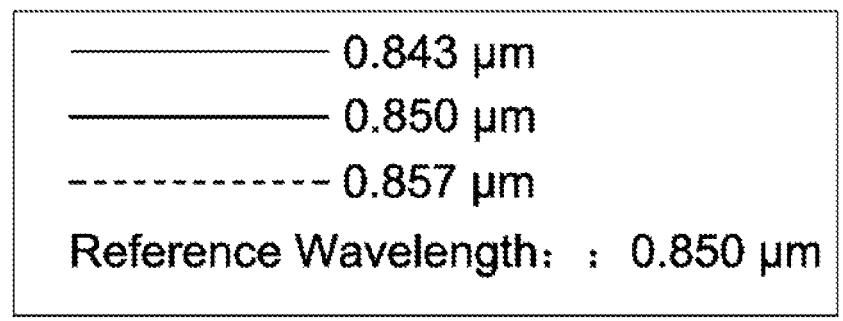
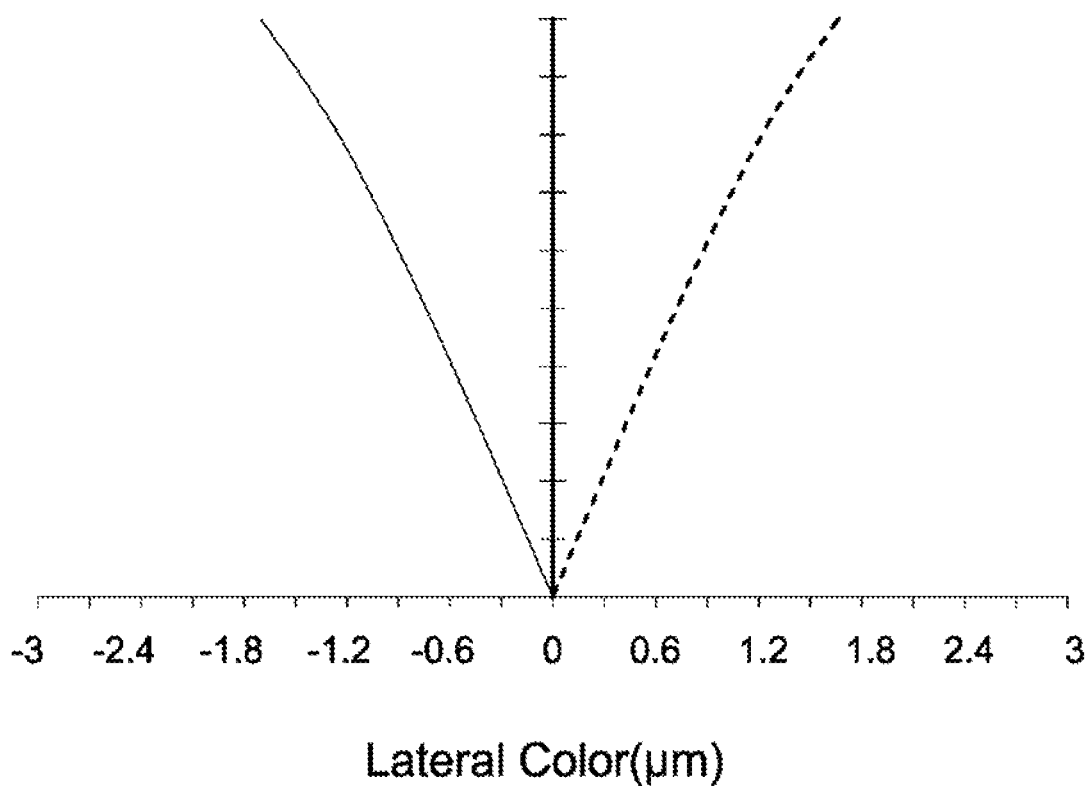
Fig. 10D

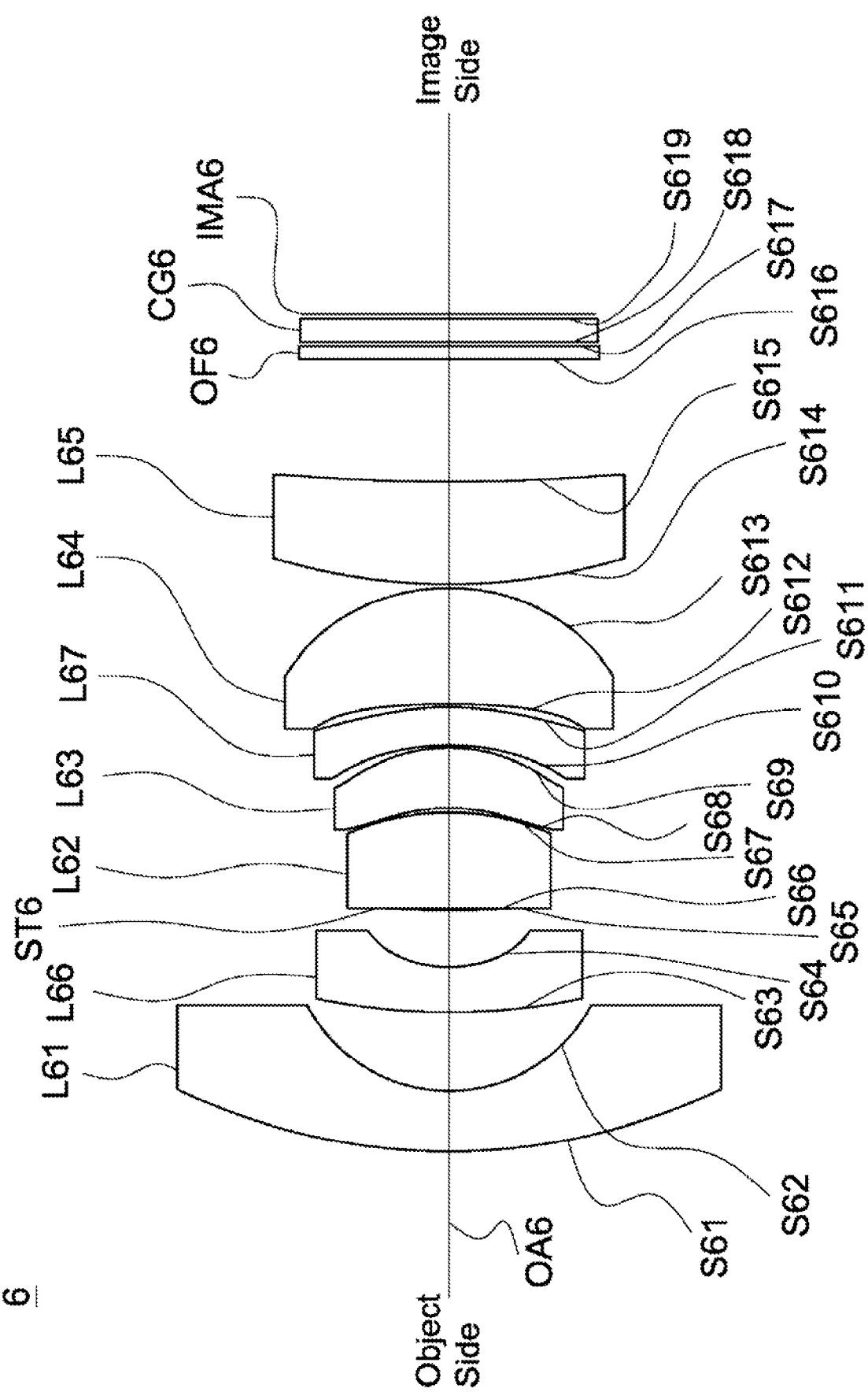

LENS ASSEMBLY

BACKGROUND OF THE INVENTION

Field of the Invention

The invention relates to a lens assembly.

Description of the Related Art

The current development trend of a lens assembly is toward miniaturization and high resolution. Additionally, the lens assembly is developed to resist environmental temperature change in accordance with different application requirements. However, the known lens assembly can't satisfy such requirements. Therefore, the lens assembly needs a new structure in order to meet the requirements of miniaturization, high resolution, and resisted environmental temperature change at the same time.

BRIEF SUMMARY OF THE INVENTION

The invention provides a lens assembly to solve the above problems. The lens assembly of the invention is provided with characteristics of a shortened total lens length, a decreased F-number, an increased resolution, a resisted environmental temperature change, and still has a good optical performance.

The lens assembly in accordance with an exemplary embodiment of the invention includes a first lens, a second lens, a third lens, a fourth lens, and a fifth lens. The first lens is a meniscus lens with negative refractive power. The second lens is with positive refractive power and includes a convex surface facing an image side. The third lens is a meniscus lens with positive refractive power. The fourth lens is with positive refractive power. The fifth lens is with refractive power and includes a convex surface facing an object side. The first lens, the second lens, the third lens, the fourth lens, and the fifth lens are arranged in order from the object side to the image side along an optical axis.

In another exemplary embodiment, the first lens includes a convex surface facing the object side and a concave surface facing the image side, the second lens further includes a concave surface facing the object side, and the third lens includes a concave surface facing the object side and a convex surface facing the image side.

In yet another exemplary embodiment, the fourth lens is a meniscus lens and includes a convex surface facing the object side and a concave surface facing the image side and the fifth lens is a biconvex lens with positive refractive power and further includes a convex surface facing the image side.

In another exemplary embodiment, the lens assembly further includes a stop disposed between the second lens and the third lens.

In yet another exemplary embodiment, the lens assembly satisfies: $0.1<\Phi ST/TTL<0.5$; wherein $\Phi ST$ is an aperture diameter of the stop and TTL is an interval from an object side surface of the first lens to an image plane along the optical axis.

In another exemplary embodiment, the fifth lens is a single lens and an air gap is disposed between the fourth lens and the fifth lens.

In yet another exemplary embodiment, the lens assembly satisfies: $-3<f1/f<-1.5$; $0.5<ET5/T5<1.5$; $0.3<\Phi 2/\Phi 3<0.8$; wherein f1 is an effective focal length of the first lens, f is an effective focal length of the lens assembly, ET5 is a periphery thickness of the fifth lens, T5 is a thickness of the fifth lens along the optical axis, $\Phi 2$ is a maximum effective optical diameter of the second lens, and $\Phi 3$ is a maximum effective optical diameter of the third lens.

In another exemplary embodiment, the lens assembly further includes a sixth lens and a seventh lens, wherein the sixth lens is a meniscus lens with negative refractive power and disposed between the first lens and the second lens, the seventh lens is a meniscus lens and disposed between the third lens and the fourth lens, and the fifth lens is a meniscus lens with positive refractive power and further includes a concave surface facing the image side.

In yet another exemplary embodiment, the first lens includes a convex surface facing the object side and a concave surface facing the image side, the second lens further includes another convex surface facing the object side, the third lens includes a concave surface facing the object side and a convex surface facing the image side, and the fourth lens includes a convex surface facing the image side.

In another exemplary embodiment, the sixth lens includes a concave surface facing the object side and a convex surface facing the image side, and the seventh lens is with positive refractive power and includes a convex surface facing the object side and a concave surface facing the image side.

In yet another exemplary embodiment, the fourth lens further includes another convex surface facing the object side.

In another exemplary embodiment, the fourth lens further includes a concave surface facing the object side.

In yet another exemplary embodiment, the sixth lens includes a convex surface facing the object side and a concave surface facing the image side, and the seventh lens is with negative refractive power and includes a concave surface facing the object side and a convex surface facing the image side.

In another exemplary embodiment, the fourth lens further includes a concave surface facing the object side.

In yet another exemplary embodiment, the lens assembly satisfies at least one of the following conditions: $65\ mm^2\times degrees \leq ((f\times FOV\times \pi)/360)\times TTL \leq 70\ mm^2\times degrees$; $L1D/R12 \leq 1.8$; $0.4 \leq L6T1/L6T2 \leq 0.8$; $1.54 \leq Nd6 \leq 1.68$; $1.54 \leq Nd7 \leq 1.68$; $9\ mm \leq Nd2\times f2 \leq 18\ mm$; wherein f is an effective focal length of the lens assembly, FOV is a field of view of the lens assembly, TTL is an interval from an object side surface of the first lens to an image plane along the optical axis, L1D is an effective optical diameter of an image side surface of the first lens, R12 is a radius of curvature of the image side surface of the first lens, L6T1 is a thickness of the sixth lens along the optical axis, L6T2 is a periphery thickness of the sixth lens, Nd6 is an index of refraction of the sixth lens, Nd7 is an index of refraction of the seventh lens, Nd2 is an index of refraction of the second lens, and f2 is an effective focal length of the second lens.

In another exemplary embodiment, the lens assembly further includes a stop disposed between the sixth lens and the third lens, wherein the lens assembly satisfies at least one of the following conditions: $25\ mm \leq Nd3\times f3 \leq 55\ mm$; $20\ mm \leq NdLG\times fLG \leq 40\ mm$; $13\ mm \leq fAS2 \leq 40\ mm$; $3.5\ mm \leq fAS \leq 5.5\ mm$; wherein Nd3 is an index of refraction of the third lens, f3 is an effective focal length of the third lens, NdLG is an index of refraction of the lens closest to the image side, fLG is an effective focal length of the lens closest to the image side, fAS2 is an effective focal length of the lens second away from the stop to the image side, and fAS is an effective focal length of a combination of all lenses between the stop and the image side.

The lens assembly in accordance with another exemplary embodiment of the invention includes a first lens, a second lens, a third lens, a fourth lens, and a fifth lens. The first lens is a meniscus lens with negative refractive power. The second lens is with positive refractive power and includes a convex surface facing an image side. The third lens is a meniscus lens with positive refractive power. The fourth lens is with positive refractive power. The fifth lens is with negative refractive power. The first lens, the second lens, the third lens, the fourth lens, and the fifth lens are arranged in order from an object side to the image side along an optical axis.

In another exemplary embodiment, the lens assembly further includes a stop disposed between the second lens and the third lens, wherein the first lens includes a convex surface facing the object side and a concave surface facing the image side, the second lens is a meniscus lens and further includes a concave surface facing the object side, the third lens includes a concave surface facing the object side and a convex surface facing the image side, the fourth lens is a biconvex lens and includes a convex surface facing the object side and another convex surface facing the image side, and the fifth lens is a meniscus lens and includes a concave surface facing the object side and a convex surface facing the image side.

In yet another exemplary embodiment, the lens assembly satisfies at least one of following conditions: $0.1<\Phi ST/TTL<0.5$; $-3<f1/f<-1.5$; $0.5<ET5/T5<1.5$; $0.3<\Phi 2/\Phi 3<0.8$; wherein $\Phi ST$ is an aperture diameter of the stop, TTL is an interval from an object side surface of the first lens to an image plane along the optical axis, f1 is an effective focal length of the first lens, f is an effective focal length of the lens assembly, ET5 is a periphery thickness of the fifth lens, T5 is a thickness of the fifth lens along the optical axis, $\Phi 2$ is a maximum effective optical diameter of the second lens, and $\Phi 3$ is a maximum effective optical diameter of the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 10A, FIG. 10B, FIG. 10C, and FIG. 10D depict a longitudinal aberration diagram, a field curvature diagram, a distortion diagram, and a lateral color diagram of the lens assembly in accordance with the fifth embodiment of the invention, respectively;

FIG. 11 is a lens layout diagram of a lens assembly in accordance with a sixth embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, and a fifth lens. The first lens is a meniscus lens with negative refractive power. The second lens is with positive refractive power and includes a convex surface facing an image side. The third lens is a meniscus lens with positive refractive power. The fourth lens is with positive refractive power. The fifth lens is with refractive power and includes a convex surface facing an object side. The first lens, the second lens, the third lens, the fourth lens, and the fifth lens are arranged in order from the object side to the image side along an optical axis.

The present invention provides another lens assembly including a first lens, a second lens, a third lens, a fourth lens, and a fifth lens. The first lens is a meniscus lens with negative refractive power. The second lens is with positive refractive power and includes a convex surface facing an image side. The third lens is a meniscus lens with positive refractive power. The fourth lens is with positive refractive power. The fifth lens is with negative refractive power. The first lens, the second lens, the third lens, the fourth lens, and the fifth lens are arranged in order from an object side to the image side along an optical axis.

Referring to Table 1, Table 2, Table 4, Table 5, Table 7, and Table 8, wherein Table 1, Table 4, and Table 7 show optical specification in accordance with a first, second, and third embodiments of the invention, respectively and Table 2, Table 5, and Table 8 show aspheric coefficients of each aspheric lens in Table 1, Table 4, and Table 7, respectively.

Figure 1:
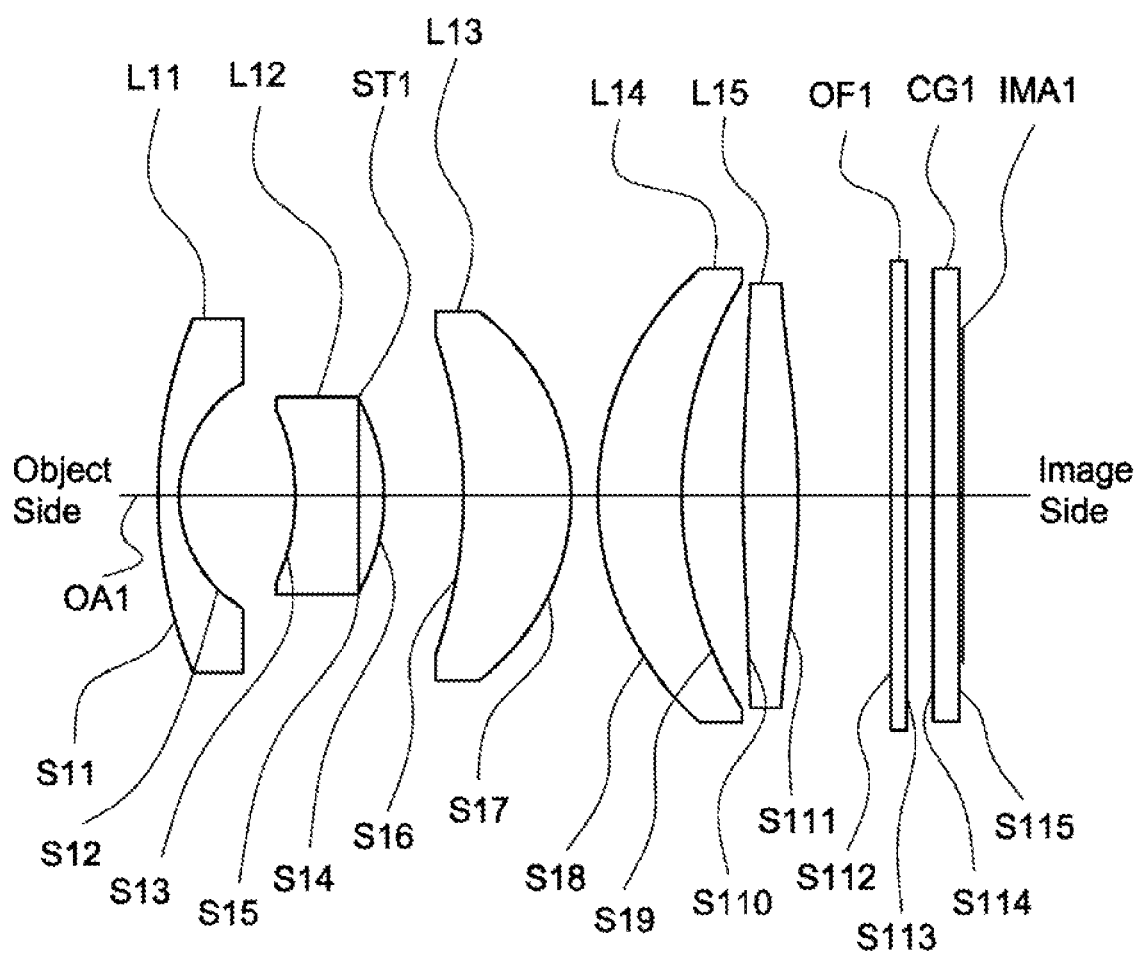
FIG. 1 is a lens layout diagram of a lens assembly in accordance with a first embodiment of the invention.
Figure 3:
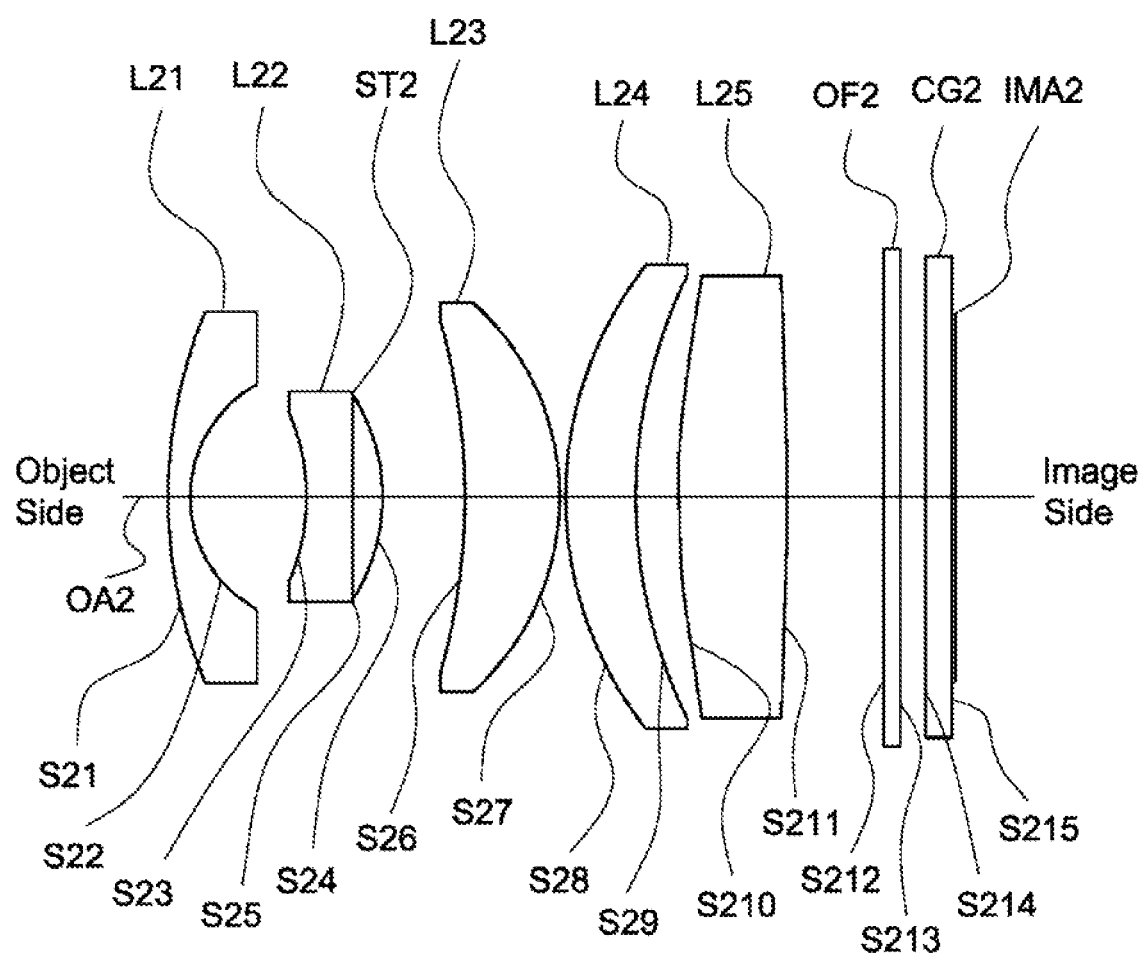
FIG. 3 is a lens layout diagram of a lens assembly in accordance with a second embodiment of the invention.
Figure 5:
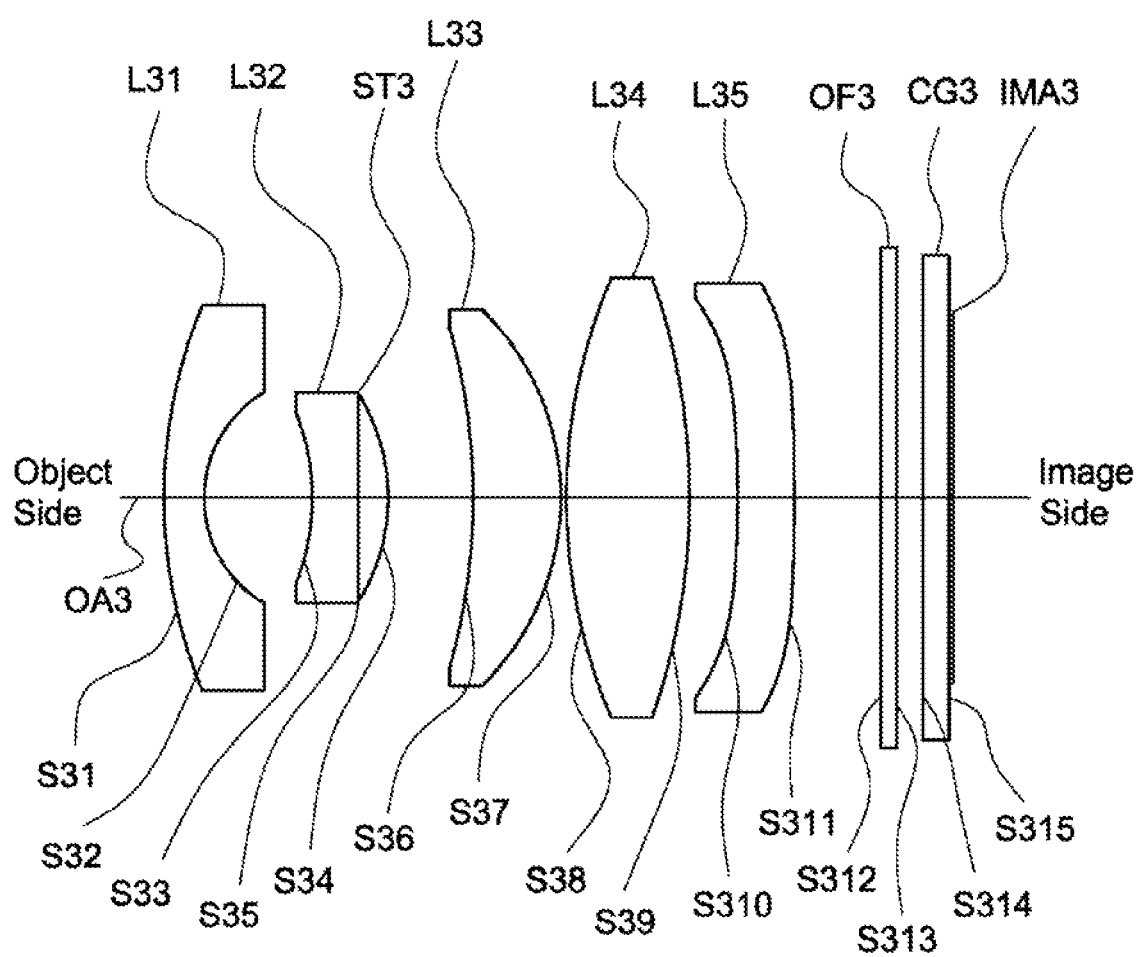
FIG. 5 is a lens layout diagram of a lens assembly in accordance with a third embodiment of the invention.

FIG. 1, FIG. 3, and FIG. 5 are lens layout diagrams of the lens assemblies in accordance with the first, second, and third embodiments of the invention, respectively.

The first lenses L11, L21, L31 are meniscus lenses with negative refractive power and made of glass material, wherein the object side surfaces S11, S21, S31 are convex surfaces, the image side surfaces S12, 22, S32 are concave surfaces, and both of the object side surfaces S11, S21, S31 and image side surfaces S12, S22, S32 are spherical surfaces.

The second lenses L12, L22, L32 are meniscus lenses with positive refractive power and made of glass material, wherein the object side surfaces S13, S23, S33 are concave surfaces, the image side surfaces S14, S24, S34 are convex surfaces, and both of the object side surfaces S13, S23, S33 and image side surfaces S14, S24, S34 are aspheric surfaces.

The third lenses L13, L23, L33 are meniscus lenses with positive refractive power and made of glass material, wherein the object side surfaces S16, S26, S36 are concave surfaces, the image side surfaces S17, S27, S37 are convex surfaces, and both of the object side surfaces S16, S26, S36 and image side surfaces S17, S27, S37 are spherical surfaces.

The fourth lenses L14, L24, L34 are with positive refractive power and made of glass material, wherein the object side surfaces S18, S28, S38 are convex surfaces and both of the object side surfaces S18, S28, S38 and image side surfaces S19, S29, S39 are spherical surfaces.

The fifth lenses L15, L25, L35 are with positive refractive power and made of glass material, wherein the image side surfaces S111, S211, S311 are convex surfaces and both of the object side surfaces S110, S210, S310 and image side surfaces S111, S211, S311 are aspheric surfaces.

In addition, the lens assemblies 1, 2, 3 satisfy at least one of the following conditions:

$$-3 < f1/f < -1.5; \quad (1)$$

$$0.5 < ET5/T5 < 1.5; \quad (2)$$

$$0.3 < \Phi2/\Phi3 < 0.8; \quad (3)$$

$$0.1 < \Phi ST/TTL < 0.5; \quad (4)$$

$$L1D/R12 \leq 1.8; \quad (5)$$

$$3.5 \text{ mm} \leq fAS \leq 5.5 \text{ mm}; \quad (6)$$

wherein f1 is an effective focal length of the first lenses L11, L21 L31 for the first to third embodiments, f is an effective focal length of the lens assemblies 1, 2, 3 for the first to third embodiments, ET5 is a periphery thickness of the fifth lenses L15, L25, L35 for the first to third embodiments, T5 is a thickness of the fifth lenses L15, L25, L35 along the optical axes OA1, OA2, OA3 for the first to third embodiments, $\Phi2$ is a maximum effective optical diameter of the second lenses L12, L22, L32 for the first to third embodiments, $\Phi3$ is a maximum effective optical diameter of the third lenses L13, L23, L33 for the first to third embodiments, $\Phi ST$ is an aperture diameter of the stops ST1, ST2, ST3 for the first to third embodiments, TTL is an interval from object side surfaces S11, S21, S31 of the first lenses L11, L21, L31 to an image planes IMA1, IMA2, IMA3 along the optical axes OA1, OA2, OA3 for the first to third embodiments, L1D is an effective optical diameter of the image side surfaces S12, S22, S32 of the first lenses L11, L21, L31 for the first to third embodiments, R12 is a radius of curvature of the image side surfaces S12, S22, S32 of the first lenses L11, L21, L31 for the first to third embodiments, and fAS is an effective focal length of a combination of all lenses between the stops ST1, ST2, ST3 and the image side for the first to third embodiments. With the lens assemblies 1, 2, 3 satisfying at least one of the above conditions (1)-(6), the total lens length can be effectively shortened, the resolution can be effectively increased, the environmental temperature change can be effectively resisted, and the aberration can be effectively corrected.

When the condition (1): $-3 < f1/f < -1.5$ is satisfied, the field of view can be increased effectively.

When the condition (2): $0.5 < ET5/T5 < 1.5$ is satisfied, the processability can be enhanced effectively.

When the condition (3): $0.3 < \Phi2/\Phi3 < 0.8$ is satisfied, the imaging range can be increased effectively.

When the condition (4): $0.1 < \Phi ST/TTL < 0.5$ is satisfied, the F-number can be decreased effectively.

When the condition (5): $L1D/R12 \leq 1.8$ is satisfied, the processing cost of lenses can be decreased effectively.

When the condition (6): $3.5 \text{ mm} \leq fAS \leq 5.5 \text{ mm}$ is satisfied, the sensitivity of the lens combination on both sides of the stop can be balanced effectively.

All glass lens design can effectively resist environmental temperature changes, so that the lens assembly still has good optical performance under high or low temperature environment, and is not easy to deteriorate after long term use and still has good optical performance.

A detailed description of a lens assembly in accordance with a first embodiment of the invention is as follows. Referring to FIG. 1, the lens assembly 1 includes a first lens L11, a second lens L12, a stop ST1, a third lens L13, a fourth lens L14, a fifth lens L1, an optical filter OF1, and a cover glass CG1, all of which are arranged in order from an object side to an image side along an optical axis OA1. In operation, the light from the object side is imaged on an image plane IMA1.

According to subject matter previously described herein, wherein: the fourth lens L14 is a meniscus lens, wherein the image side surface S19 is a concave surface; the fifth lens L15 is a biconvex lens, wherein the object side surface S110 is a convex surface; both of the object side surface S112 and image side surface S113 of the optical filter OF1 are plane surfaces; and both of the object side surface S114 and image side surface S115 of the cover glass CG1 are plane surfaces.

With the above design of the lenses, stop ST1, and at least one of the conditions (1)-(6) satisfied, the lens assembly 1 can have an effective shortened total lens length, an effective increased resolution, an effective resisted environmental temperature change, and an effective corrected aberration.

Table 1 shows the optical specification of the lens assembly 1 in FIG. 1.

TABLE 1

Effective Focal Length = 2.858 mm F-number = 1.33
Total Lens Length = 15.405 mm Field of View = 141.24 degrees

| Surface Number | Radius of Curvature (mm) | Thickness (mm) | Nd | Vd | Effective Focal Length (mm) | Remark |
|---|---|---|---|---|---|---|
| S11 | 8.860 | 0.409 | 1.61 | 56.7 | −5.998 | L11 |
| S12 | 2.505 | 2.213 | | | | |
| S13 | −4.551 | 1.730 | 1.82 | 42.5 | 11.200 | L12 |
| S14 | −3.523 | −0.512 | | | | |
| S15 | ∞ | 2.006 | | | | ST1 |
| S16 | −8.841 | 2.054 | 1.75 | 51 | 9.945 | L13 |
| S17 | −4.386 | 0.536 | | | | |
| S18 | 5.788 | 1.589 | 1.69 | 54.6 | 25.433 | L14 |
| S19 | 7.736 | 1.161 | | | | |
| S110 | 19.748 | 1.060 | 1.86 | 39.9 | 11.741 | L15 |
| S111 | −19.208 | 1.782 | | | | |
| S112 | ∞ | 0.300 | 1.52 | 64.2 | | OF1 |
| S113 | ∞ | 0.500 | | | | |
| S114 | ∞ | 0.500 | 1.52 | 64.2 | | CG1 |
| S115 | ∞ | 0.076 | | | | |

The aspheric surface sag z of each aspheric lens in table 1 can be calculated by the following formula:

$$z = ch^2 / \{1 + [1-(k+1)c^2h^2]^{1/2}\} + Ah^4 + Bh^6 + Ch^8$$

where c is curvature, h is the vertical distance from the lens surface to the optical axis, k is conic constant and A, B, and C are aspheric coefficients.

In the first embodiment, the conic constant k and the aspheric coefficients A, B, C of each aspheric lens are shown in Table 2.

TABLE 2

| Surface Number | k | A | B | C |
|---|---|---|---|---|
| S13 | 0.00E+00 | −6.981E−03 | −4.562E−04 | 4.379E−05 |
| S14 | 0.00E+00 | 3.203E−04 | −1.811E−04 | 7.264E−05 |
| S110 | 0.00E+00 | −2.308E−03 | 1.187E−04 | −2.379E−06 |
| S111 | 0.00E+00 | −1.032E−03 | 1.541E−04 | −4.077E−06 |

Table 3 shows the parameters and condition values for conditions (1)-(6) in accordance with the first embodiment of the invention. It can be seen from Table 3 that the lens assembly 1 of the first embodiment satisfies the conditions (1)-(6).

TABLE 3

| | | | | | | |
|---|---|---|---|---|---|---|
| ET5 | 0.589 mm | T5 | | 1.060 mm | Φ2 | 3.749 mm |
| Φ3 | 7.017 mm | ΦST | | 3.742 mm | L1D | 4.30 mm |
| fAS | 4.943 mm | | | | | |
| f1/f | −2.099 | ET5/T5 | | 0.556 | Φ2/Φ3 | 0.534 |
| ΦST/TTL | 0.243 | L1D/R12 | | 1.72 | | |

Figure 2A:
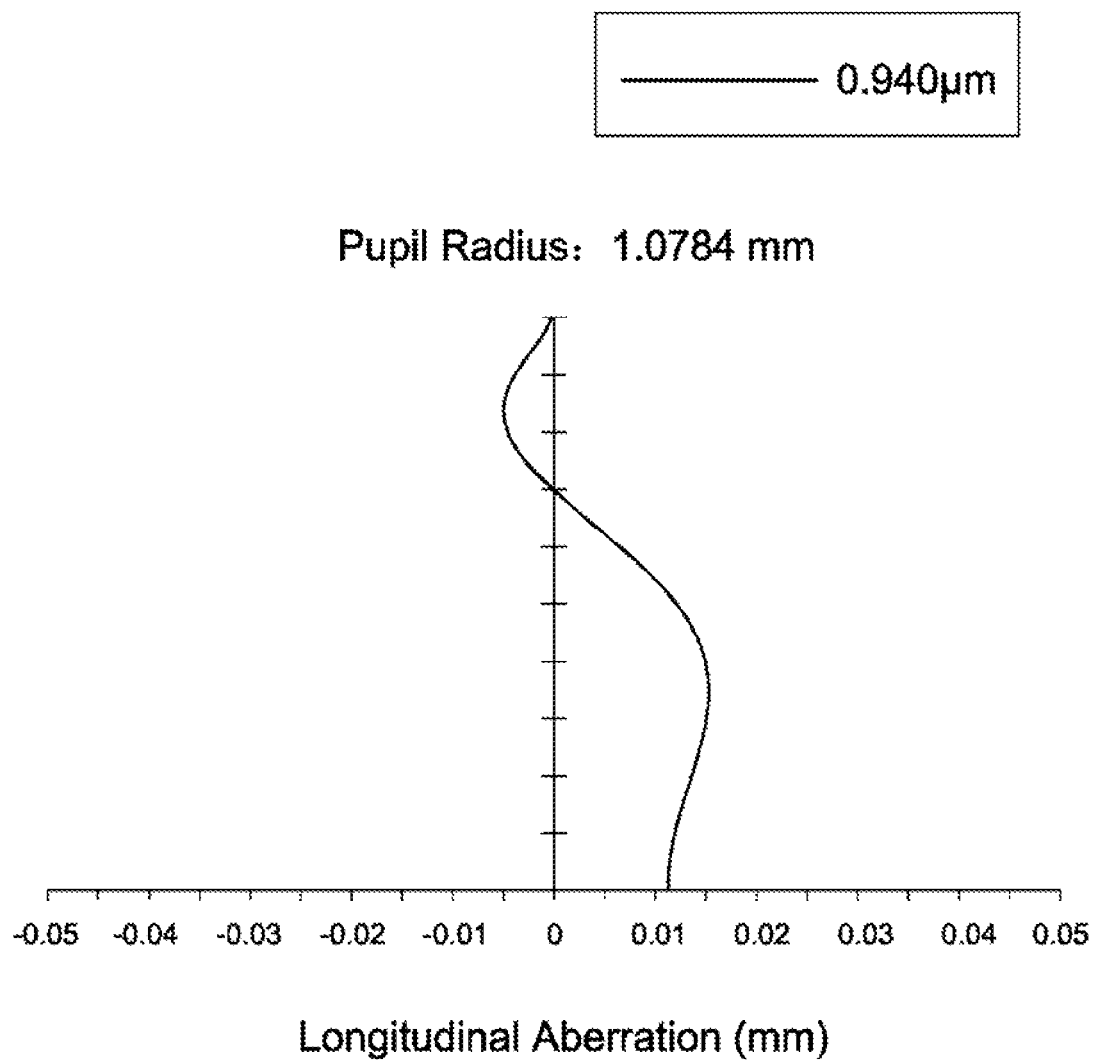
FIG. 2A, FIG. 2B, and FIG. 2C depict a longitudinal aberration diagram, a field curvature diagram, and a distortion diagram of the lens assembly in accordance with the first embodiment of the invention, respectively.
Figure 2B:
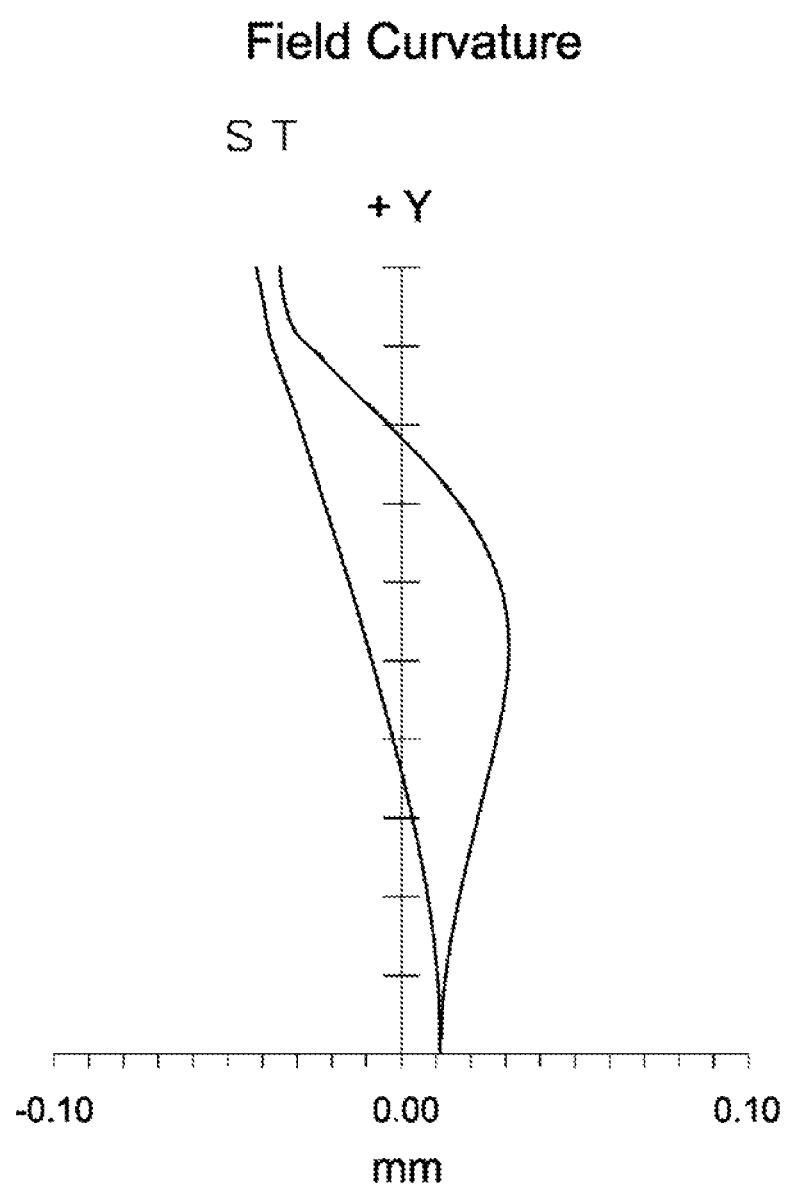
Figure 2C:
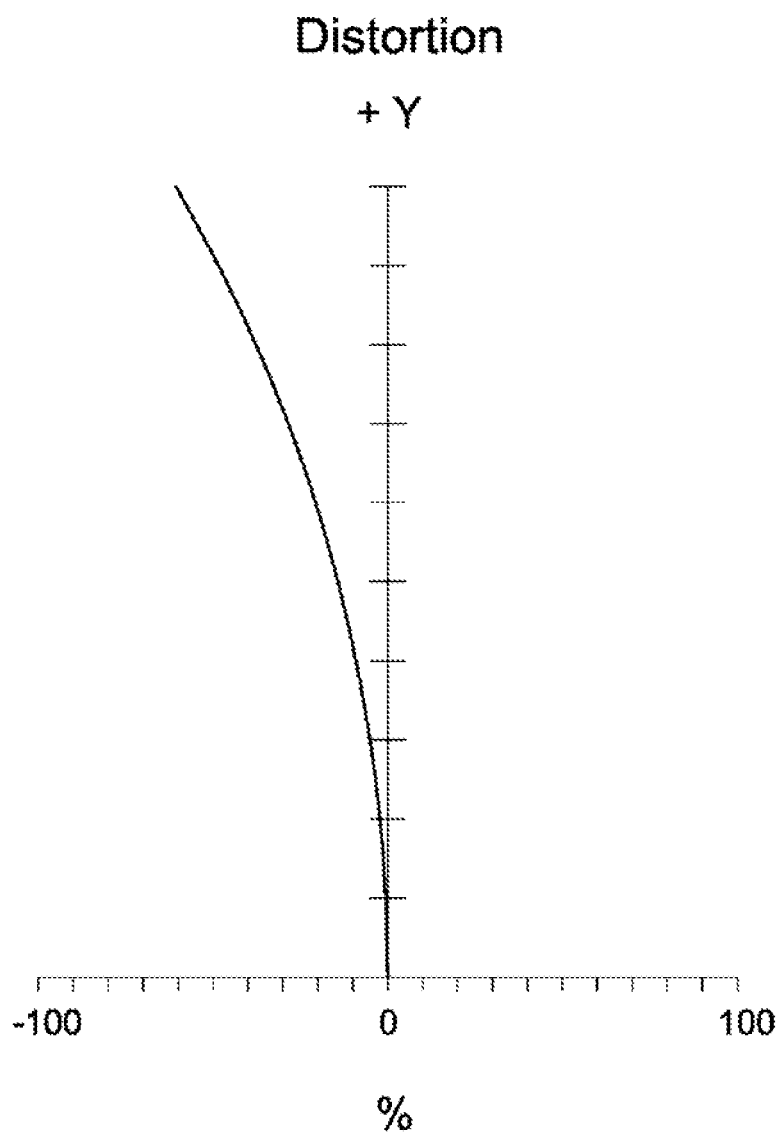

In addition, the lens assembly 1 of the first embodiment can meet the requirements of optical performance as seen in FIGS. 2A-2C. It can be seen from FIG. 2A that the longitudinal aberration in the lens assembly 1 of the first embodiment ranges from −0.001 mm to 0.015 mm. It can be seen from FIG. 2B that the field curvature of tangential direction and sagittal direction in the lens assembly 1 of the first embodiment ranges from −0.04 mm to 0.05 mm. It can be seen from FIG. 2C that the distortion in the lens assembly 1 of the first embodiment ranges from −70% to 0%. It is obvious that the longitudinal aberration, the field curvature, and the distortion of the lens assembly 1 of the first embodiment can be corrected effectively. Therefore, the lens assembly 1 of the first embodiment is capable of good optical performance.

Referring to FIG. 3, the lens assembly 2 includes a first lens L21, a second lens L22, a stop ST2, a third lens L23, a fourth lens L24, a fifth lens L25, an optical filter OF2, and a cover glass CG2, all of which are arranged in order from an object side to an image side along an optical axis OA2. In operation, the light from the object side is imaged on an image plane IMA2.

According to subject matter previously described herein, wherein: the fourth lens L24 is a meniscus lens, wherein the image side surface S29 is a concave surface; the fifth lens L25 is a biconvex lens, wherein the object side surface S210 is a convex surface; both of the object side surface S212 and image side surface S213 of the optical filter OF2 are plane surfaces; and both of the object side surface S214 and image side surface S215 of the cover glass CG2 are plane surfaces.

With the above design of the lenses, stop ST2, and at least one of the conditions (1)-(6) satisfied, the lens assembly 2 can have an effective shortened total lens length, an effective increased resolution, an effective resisted environmental temperature change, and an effective corrected aberration.

Table 4 shows the optical specification of the lens assembly 2 in FIG. 3.

TABLE 4

Effective Focal Length = 2.829 mm F-number = 1.34
Total Lens Length = 15.192 mm Field of View = 148.00 degrees

| Surface Number | Radius of Curvature (mm) | Thickness (mm) | Nd | Vd | Effective Focal Length (mm) | Remark |
|---|---|---|---|---|---|---|
| S21 | 8.113 | 0.448 | 1.61 | 56.7 | −5.339 | L21 |
| S22 | 2.241 | 2.224 | | | | |
| S23 | −4.429 | 1.472 | 1.82 | 42.5 | 10.894 | L22 |
| S24 | −3.366 | −0.580 | | | | |
| S25 | ∞ | 2.169 | | | | ST2 |
| S26 | −10.842 | 1.827 | 1.69 | 53.3 | 10.108 | L23 |
| S27 | −4.497 | 0.105 | | | | |
| S28 | 6.371 | 1.352 | 1.69 | 54.9 | 30.167 | L24 |
| S29 | 8.456 | 0.821 | | | | |
| S210 | 12.705 | 2.106 | 1.86 | 39.9 | 11.247 | L25 |
| S211 | −34.017 | 1.873 | | | | |
| S212 | ∞ | 0.300 | 1.52 | 64.2 | | OF2 |
| S213 | ∞ | 0.500 | | | | |
| S214 | ∞ | 0.500 | 1.52 | 64.2 | | CG2 |
| S215 | ∞ | 0.076 | | | | |

The definition of aspheric surface sag z of each aspheric lens in Table 4 is the same as that of in Table 1, and is not described here again.

In the second embodiment, the conic constant k and the aspheric coefficients A, B, C of each aspheric lens are shown in Table 5.

TABLE 5

| Surface Number | k | A | B | C |
|---|---|---|---|---|
| S23 | 0.00E+00 | −8.17E−03 | −1.31E−03 | −7.49E−05 |
| S24 | 0.00E+00 | −1.85E−03 | −1.97E−04 | 0.00E+00 |
| S210 | 0.00E+00 | −4.54E−04 | −1.57E−05 | 0.00E+00 |
| S211 | 0.00E+00 | 9.83E−04 | −3.33E−05 | 0.00E+00 |

Table 6 shows the parameters and condition values for conditions (1)-(6) in accordance with the second embodiment of the invention. It can be seen from Table 6 that the lens assembly 2 of the second embodiment satisfies the conditions (1)-(6).

TABLE 6

| | | | | | | |
|---|---|---|---|---|---|---|
| ET5 | 1.529 mm | T5 | | 2.106 mm | Φ2 | 3.742 mm |
| Φ3 | 6.998 mm | ΦST | | 3.742 mm | L1D | 4.04 mm |
| fAS | 4.876 mm | | | | | |
| f1/f | −1.887 | ET5/T5 | | 0.726 | Φ2/Φ3 | 0.535 |
| ΦST/TTL | 0.246 | L1D/R12 | | 1.80 | | |

Figure 4A:
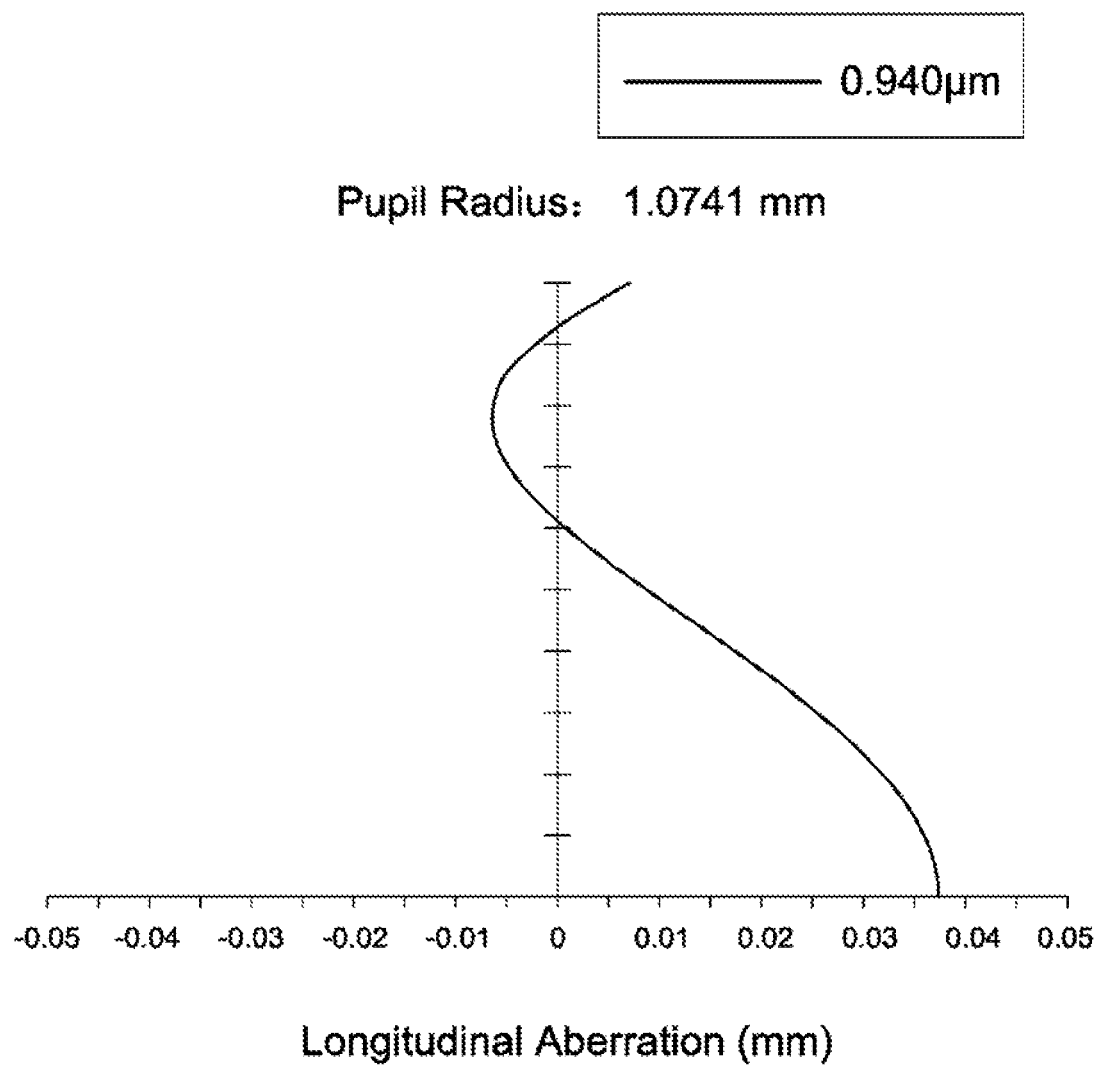
FIG. 4A, FIG. 4B, and FIG. 4C depict a longitudinal aberration diagram, a field curvature diagram, and a distortion diagram of the lens assembly in accordance with the second embodiment of the invention, respectively.
Figure 4B:
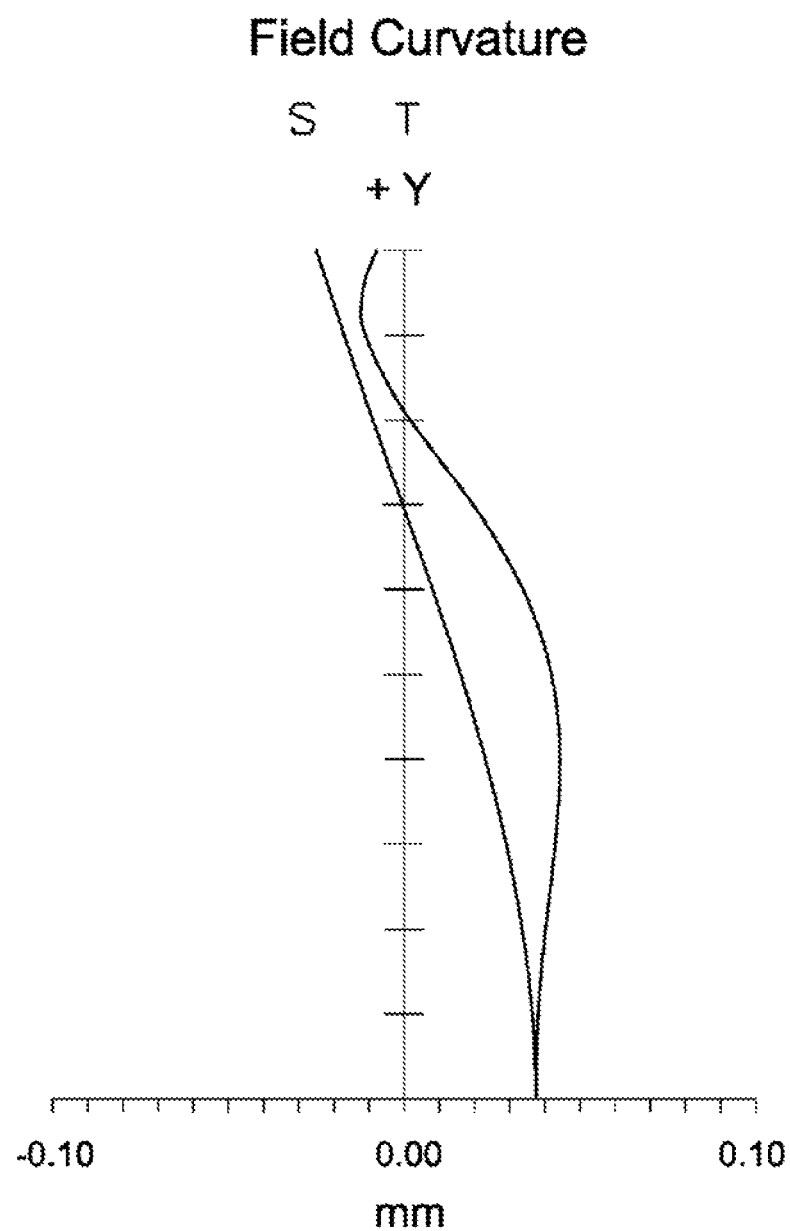
Figure 4C:
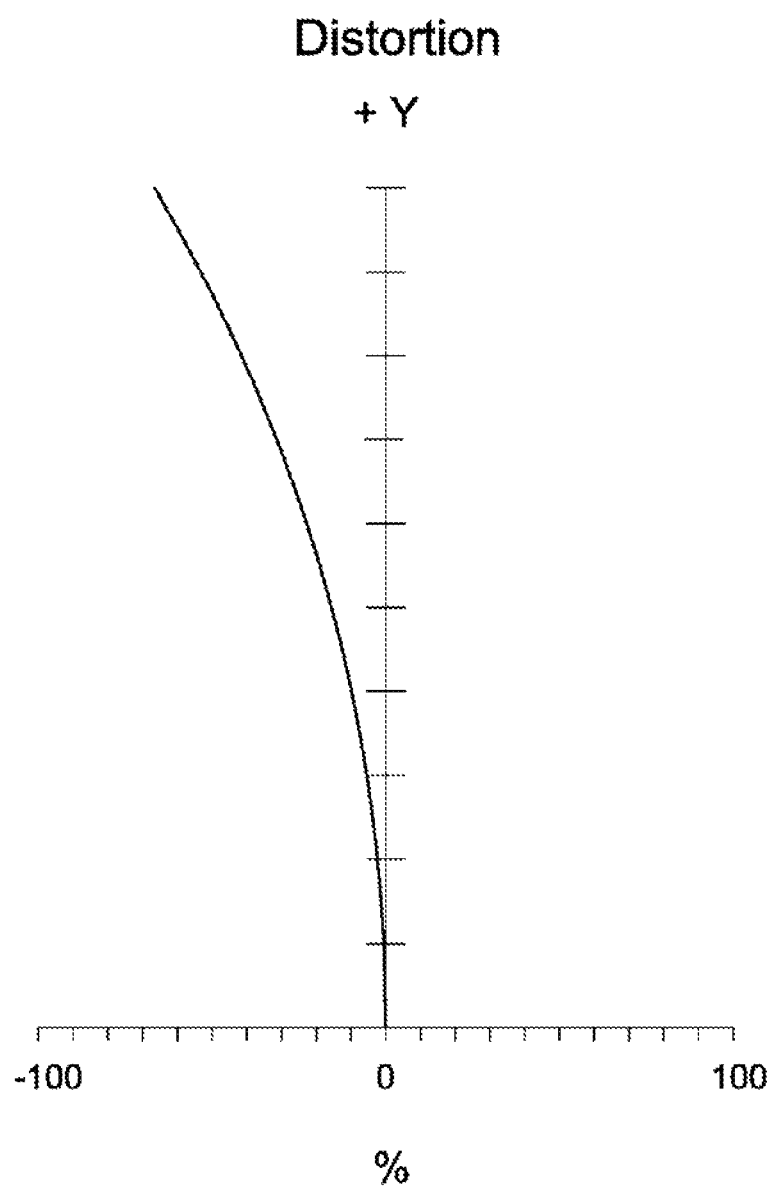

In addition, the lens assembly 2 of the second embodiment can meet the requirements of optical performance as seen in FIGS. 4A-4C. It can be seen from FIG. 4A that the longitudinal aberration in the lens assembly 2 of the second embodiment ranges from −0.01 mm to 0.04 mm. It can be seen from FIG. 4B that the field curvature of tangential direction and sagittal direction in the lens assembly 2 of the second embodiment ranges from −0.04 mm to 0.05 mm. It can be seen from FIG. 4C that the distortion in the lens assembly 2 of the second embodiment ranges from −70% to 0%. It is obvious that the longitudinal aberration, the field curvature, and the distortion of the lens assembly 2 of the second embodiment can be corrected effectively. Therefore, the lens assembly 2 of the second embodiment is capable of good optical performance.

Referring to FIG. 5, the lens assembly 3 includes a first lens L31, a second lens L32, a stop ST3, a third lens L33, a fourth lens L34, a fifth lens L35, an optical filter OF3, and a cover glass CG3, all of which are arranged in order from an object side to an image side along an optical axis OA3. In operation, the light from the object side is imaged on an image plane IMA3.

According to subject matter previously described herein, wherein: the fourth lens L34 is a biconvex lens, wherein the image side surface S39 is a convex surface; the fifth lens L35 is a meniscus lens, wherein the object side surface S310 is a concave surface; both of the object side surface S312 and image side surface S313 of the optical filter OF3 are plane surfaces; and both of the object side surface S314 and image side surface S315 of the cover glass CG3 are plane surfaces.

With the above design of the lenses, stop ST3, and at least one of the conditions (1)-(6) satisfied, the lens assembly 3 can have an effective shortened total lens length, an effective increased resolution, an effective resisted environmental temperature change, and an effective corrected aberration.

Table 7 shows the optical specification of the lens assembly 3 in FIG. 5.

TABLE 7

Effective Focal Length = 2.874 mm F-number = 1.33
Total Lens Length = 15.081 mm Field of View = 148.00 degrees

| Surface Number | Radius of Curvature (mm) | Thickness (mm) | Nd | Vd | Effective Focal Length (mm) | Remark |
|---|---|---|---|---|---|---|
| S31 | 8.489 | 0.782 | 1.61 | 56.7 | −5.026 | L31 |
| S32 | 2.140 | 2.046 | | | | |
| S33 | −4.793 | 1.452 | 1.82 | 42.5 | 10.422 | L32 |
| S34 | −3.448 | −0.569 | | | | |
| S35 | ∞ | 2.203 | | | | ST3 |
| S36 | −10.206 | 1.667 | 1.69 | 53.2 | 10.588 | L33 |
| S37 | −4.503 | 0.104 | | | | |
| S38 | 9.396 | 2.380 | 1.69 | 53.2 | 7.762 | L34 |
| S39 | −10.833 | 0.890 | | | | |
| S310 | −30.535 | 1.089 | 1.92 | 24 | −49.981 | L35 |
| S311 | −99.276 | 1.659 | | | | |
| S312 | ∞ | 0.300 | 1.52 | 64.2 | | OF3 |
| S313 | ∞ | 0.500 | | | | |
| S314 | ∞ | 0.500 | 1.52 | 64.2 | | CG3 |
| S315 | ∞ | 0.076 | | | | |

The definition of aspheric surface sag z of each aspheric lens in Table 7 is the same as that of in Table 1, and is not described here again.

In the third embodiment, the conic constant k and the aspheric coefficients A, B, C of each aspheric lens are shown in Table 8.

TABLE 8

| Surface Number | k | A | B | C |
|---|---|---|---|---|
| S33 | 0.00E+00 | −7.76E−03 | −1.49E−03 | 0.00E+00 |
| S34 | 0.00E+00 | −1.83E−03 | −1.85E−04 | 0.00E+00 |
| S310 | 0.00E+00 | −3.64E−03 | 0.00E+00 | 0.00E+00 |
| S311 | 0.00E+00 | −2.56E−03 | 0.00E+00 | 0.00E+00 |

Table 9 shows the parameters and condition values for conditions (1)-(6) in accordance with the third embodiment of the invention. It can be seen from Table 9 that the lens assembly 3 of the third embodiment satisfies the conditions (1)-(6).

TABLE 9

| ET5 | 1.268 mm | T5 | 1.089 mm | Φ2 | 3.755 mm |
|---|---|---|---|---|---|
| Φ3 | 6.721 mm | ΦST | 3.759 mm | L1D | 3.78 mm |

TABLE 9-continued

| fAS | 4.793 mm | | | | |
|---|---|---|---|---|---|
| f1/f | −1.749 | ET5/T5 | 1.164 | Φ2/Φ3 | 0.559 |
| ΦST/TTL | 0.249 | L1D/R12 | 1.77 | | |

Figure 6A:
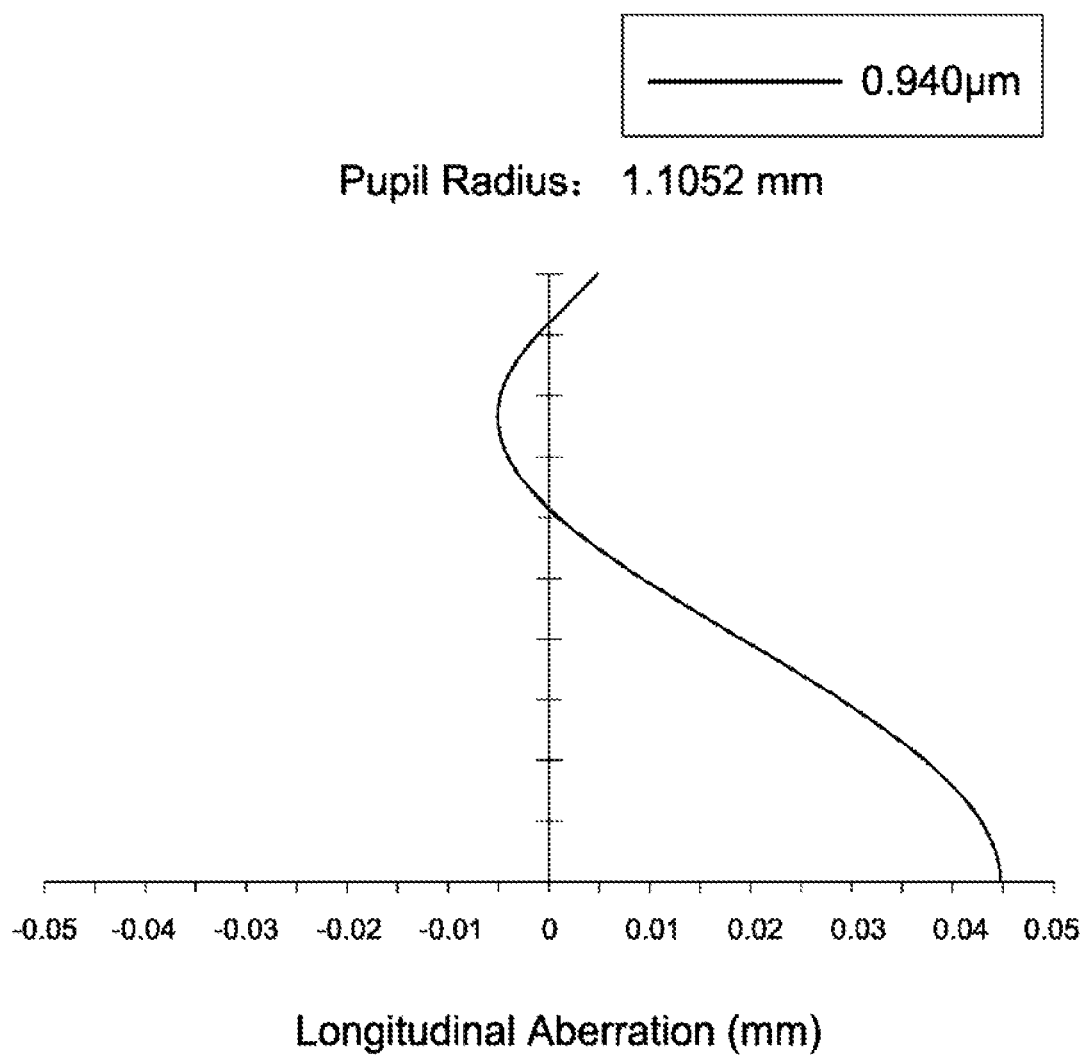
FIG. 6A, FIG. 6B, and FIG. 6C depict a longitudinal aberration diagram, a field curvature diagram, and a distortion diagram of the lens assembly in accordance with the third embodiment of the invention, respectively.
Figure 6B:
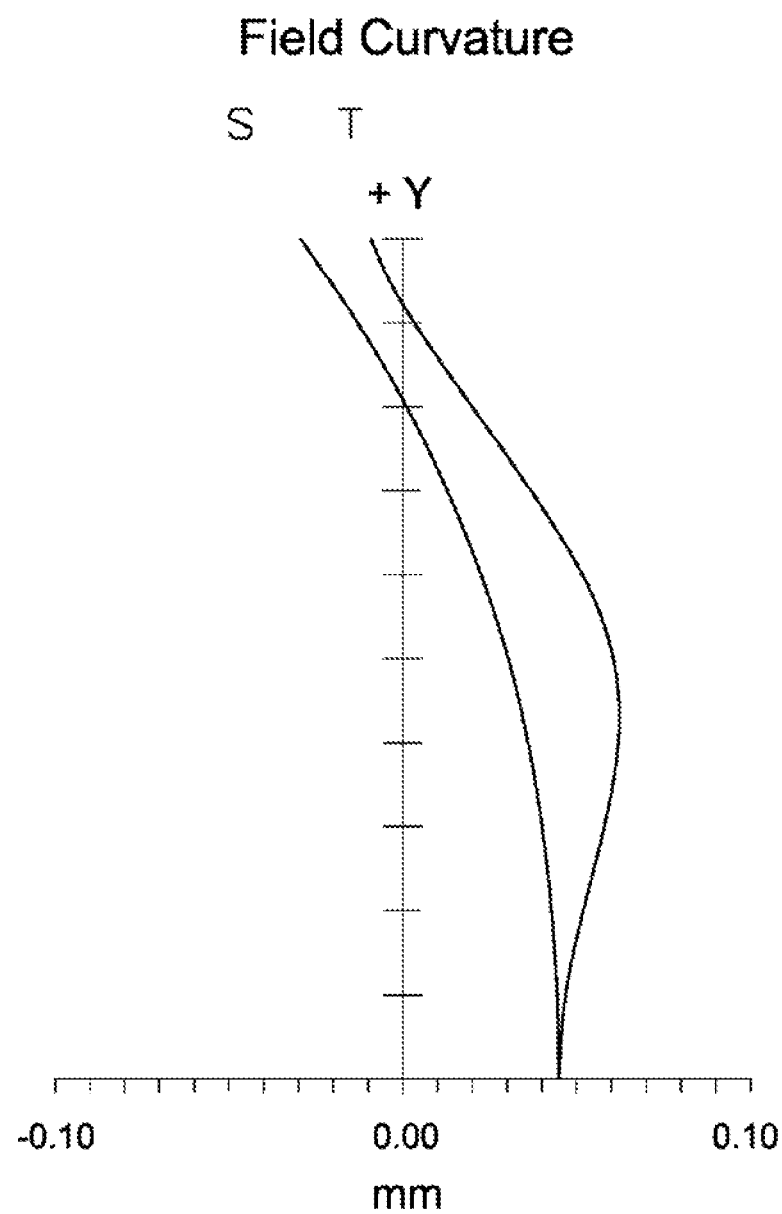
Figure 6C:
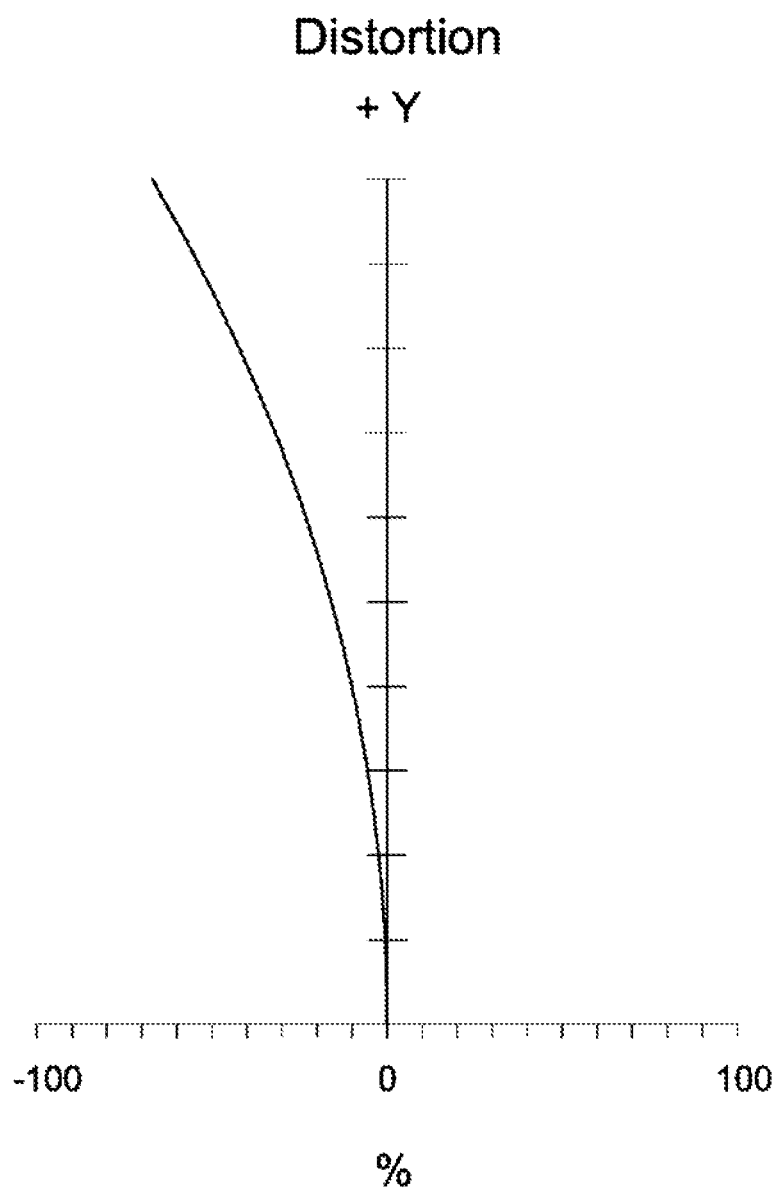

In addition, the lens assembly 3 of the third embodiment can meet the requirements of optical performance as seen in FIGS. 6A-6C. It can be seen from FIG. 6A that the longitudinal aberration in the lens assembly 3 of the third embodiment ranges from −0.001 mm to 0.045 mm. It can be seen from FIG. 6B that the field curvature of tangential direction and sagittal direction in the lens assembly 3 of the third embodiment ranges from −0.03 mm to 0.07 mm. It can be seen from FIG. 6C that the distortion in the lens assembly 3 of the third embodiment ranges from −70% to 0%. It is obvious that the longitudinal aberration, the field curvature, and the distortion of the lens assembly 3 of the third embodiment can be corrected effectively. Therefore, the lens assembly 3 of the third embodiment is capable of good optical performance.

Referring to Table 10, Table 11, Table 13, Table 14, Table 16, and Table 17, wherein Table 10, Table 13, and Table 16 show optical specification in accordance with a fourth, fifth, and sixth embodiments of the invention, respectively and Table 11, Table 14, and Table 17 show aspheric coefficients of each aspheric lens in Table 10, Table 13, and Table 16, respectively.

Figure 7:
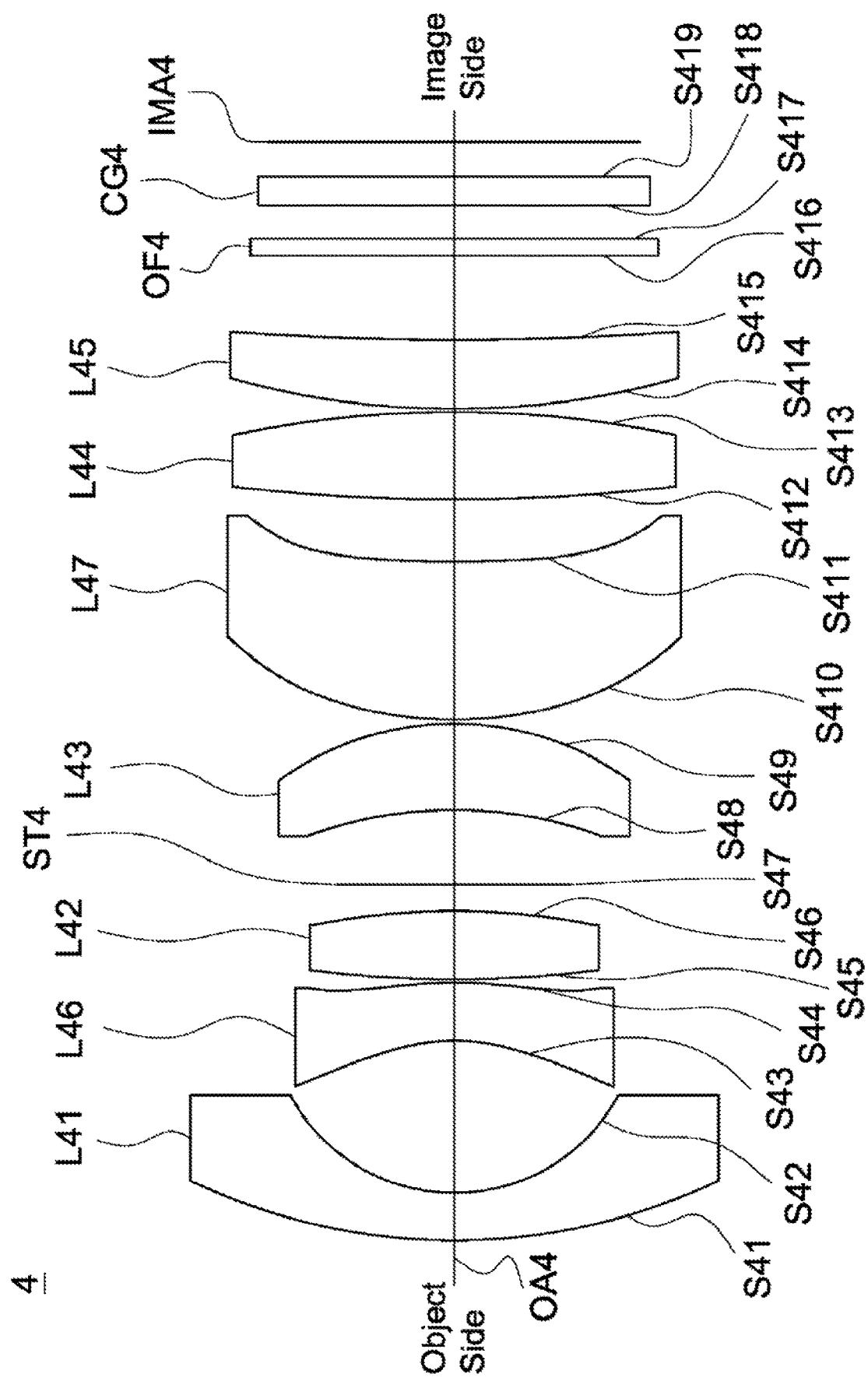
FIG. 7 is a lens layout diagram of a lens assembly in accordance with a fourth embodiment of the invention.
Figure 8A:
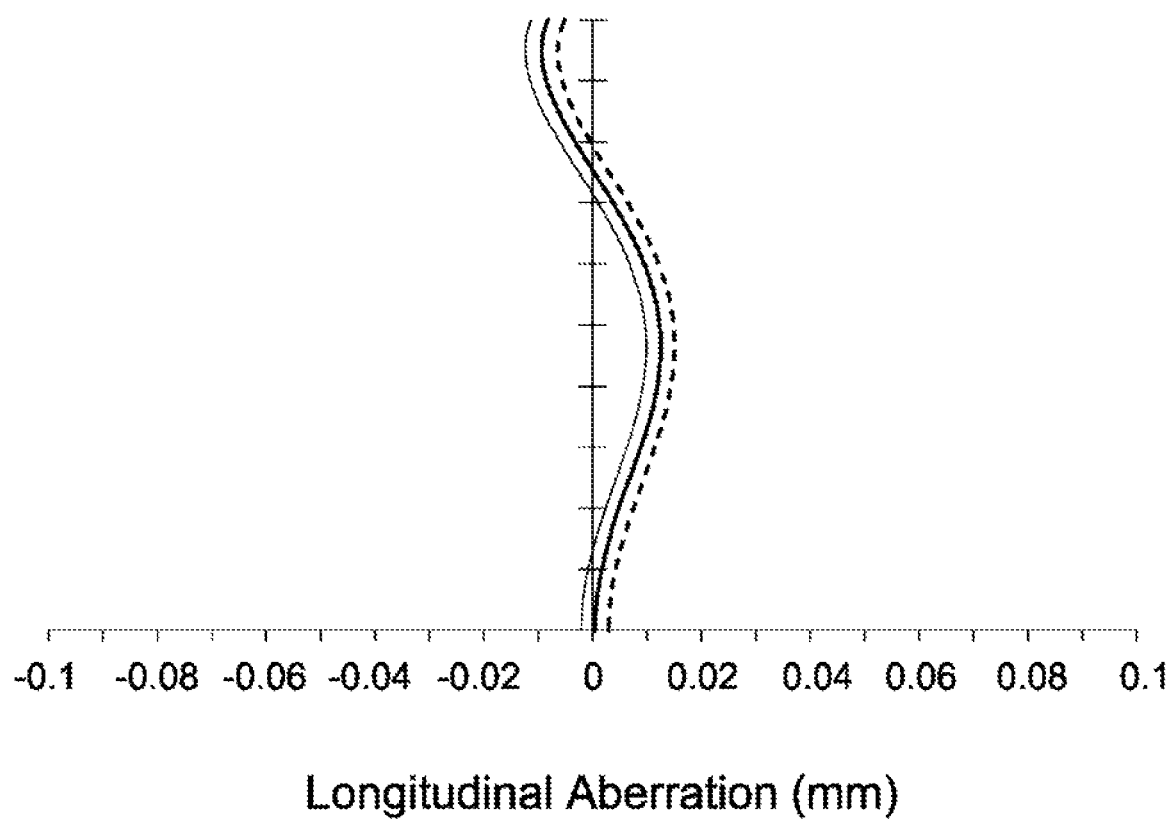
FIG. 8A, FIG. 8B, FIG. 8C, and FIG. 8D depict a longitudinal aberration diagram, a field curvature diagram, a distortion diagram, and a lateral color diagram of the lens assembly in accordance with the fourth embodiment of the invention, respectively.
Figure 8B:
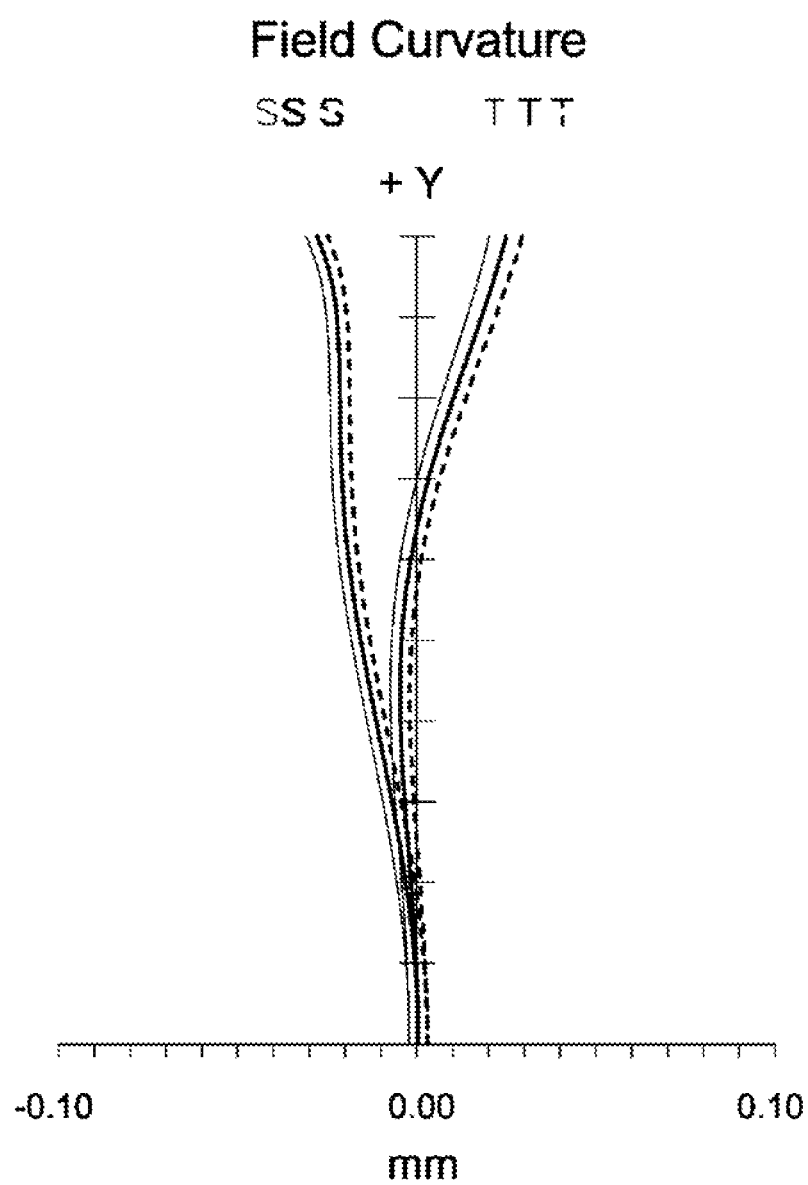
Figure 8C:
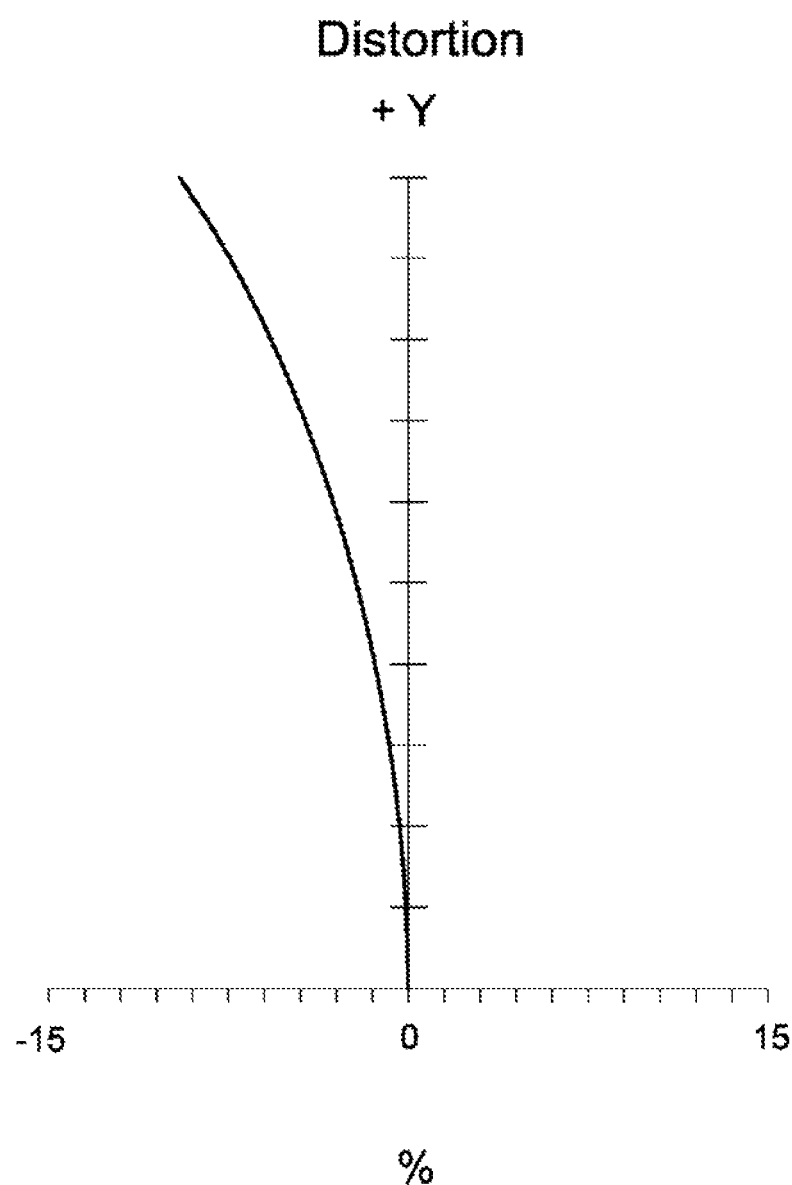
Figure 8D:
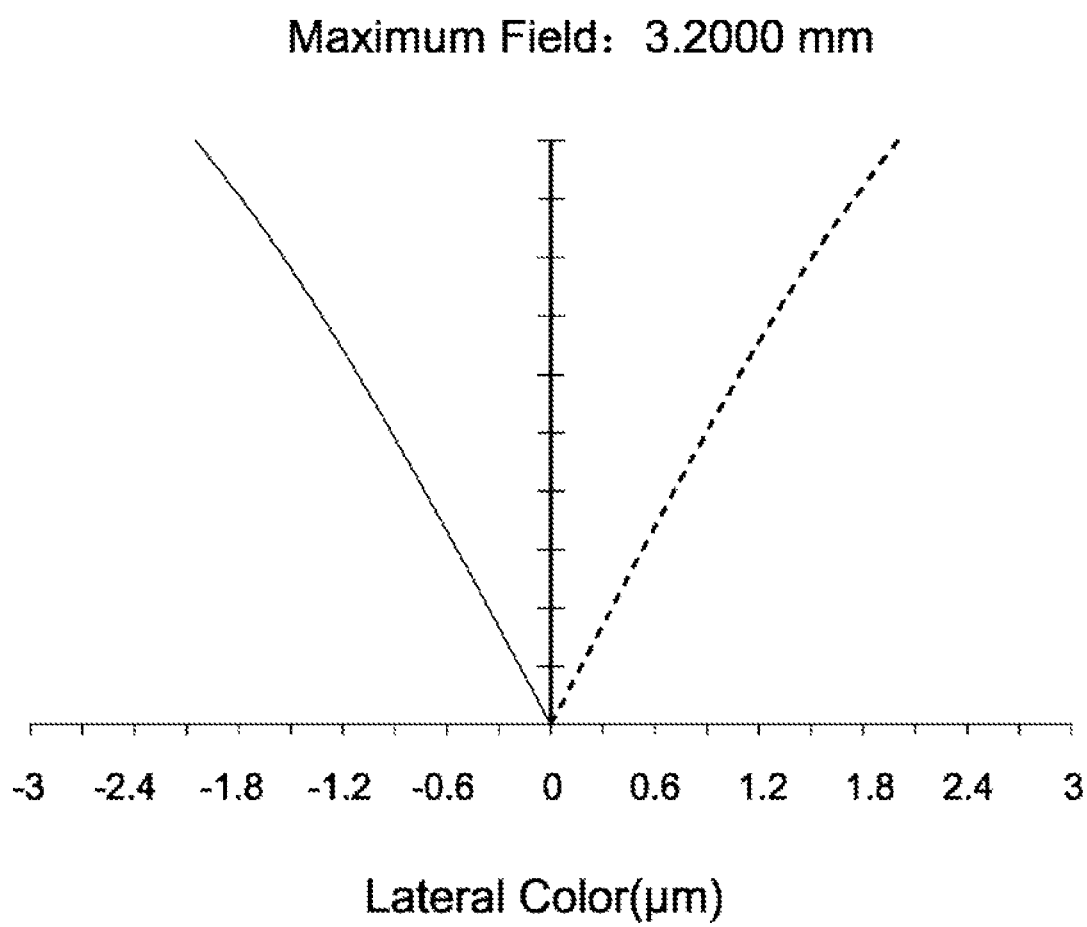
Figure 9:
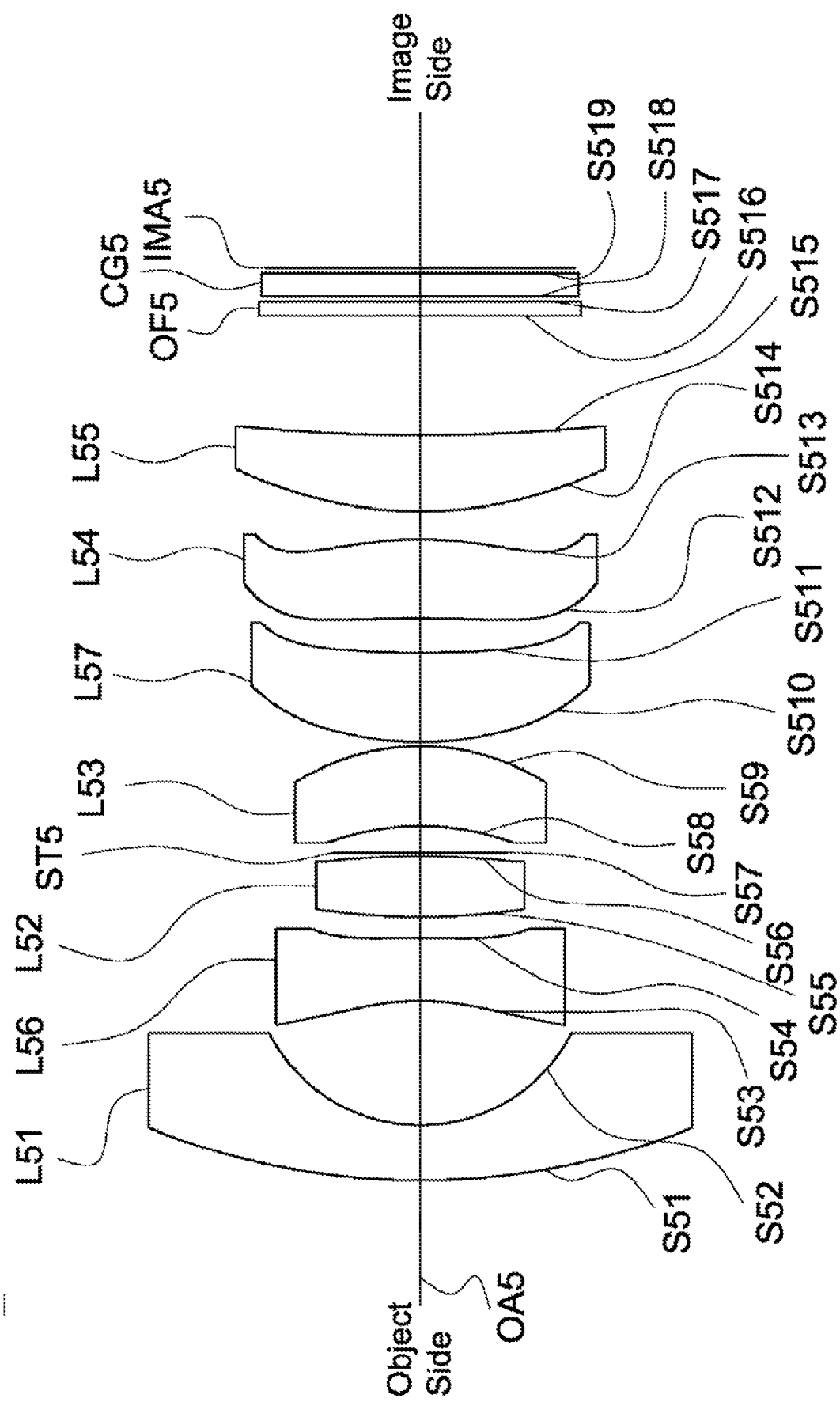
FIG. 9 is a lens layout diagram of a lens assembly in accordance with a fifth embodiment of the invention.
Figure 10A:
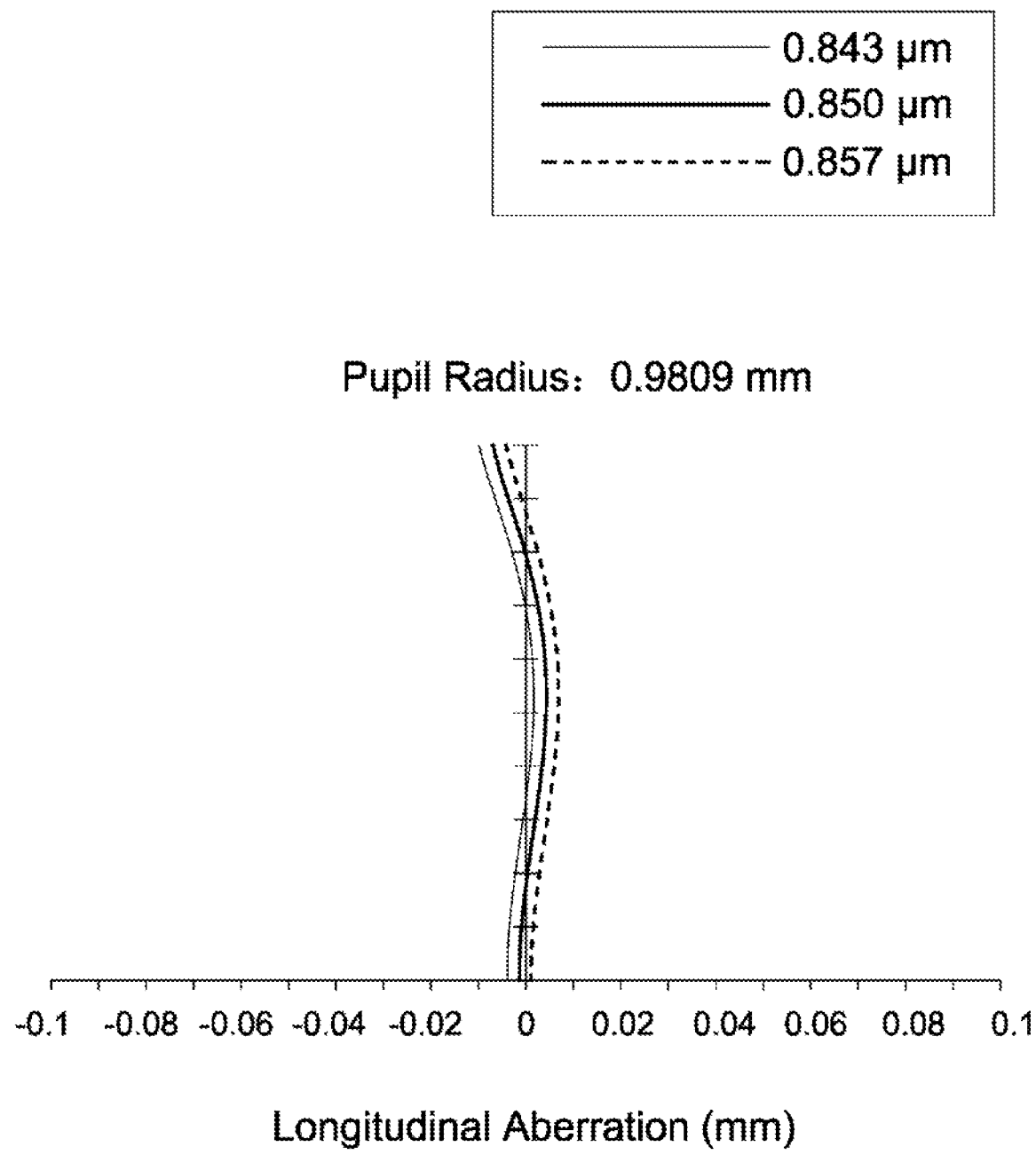
Figure 10B:
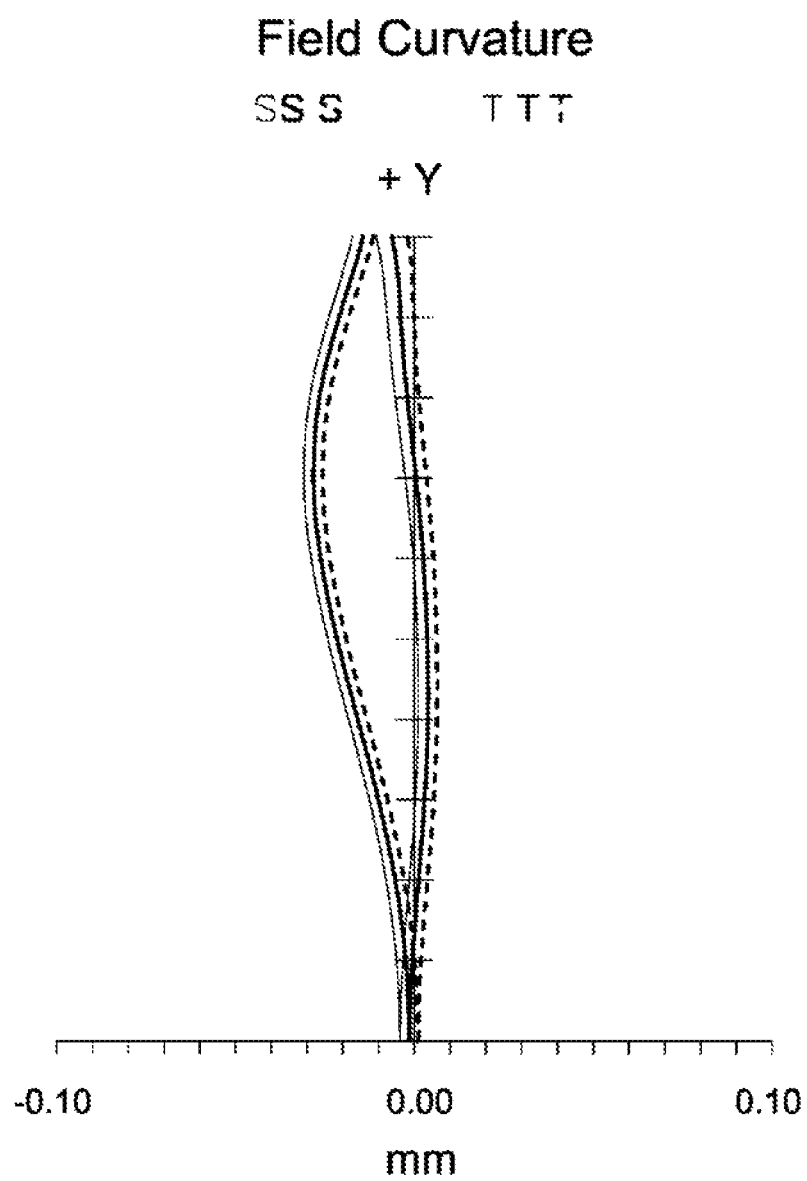
Figure 10C:
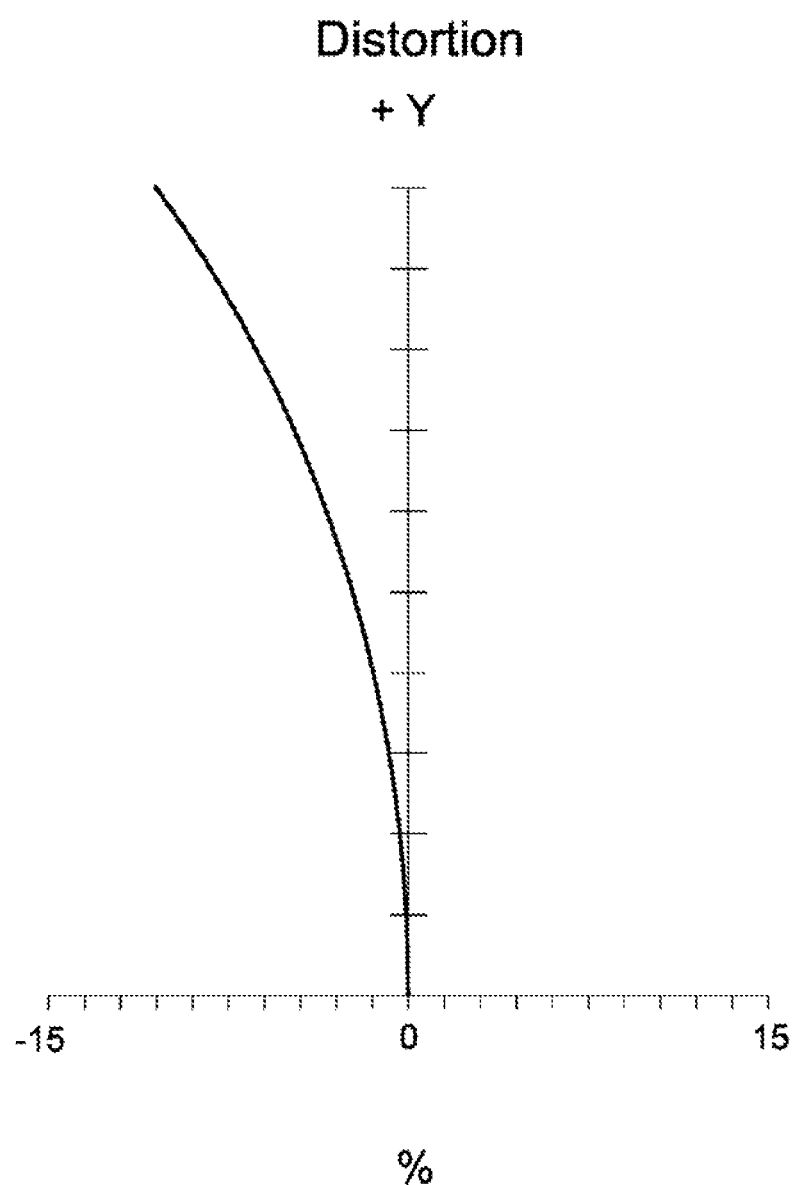
Figure 12A:
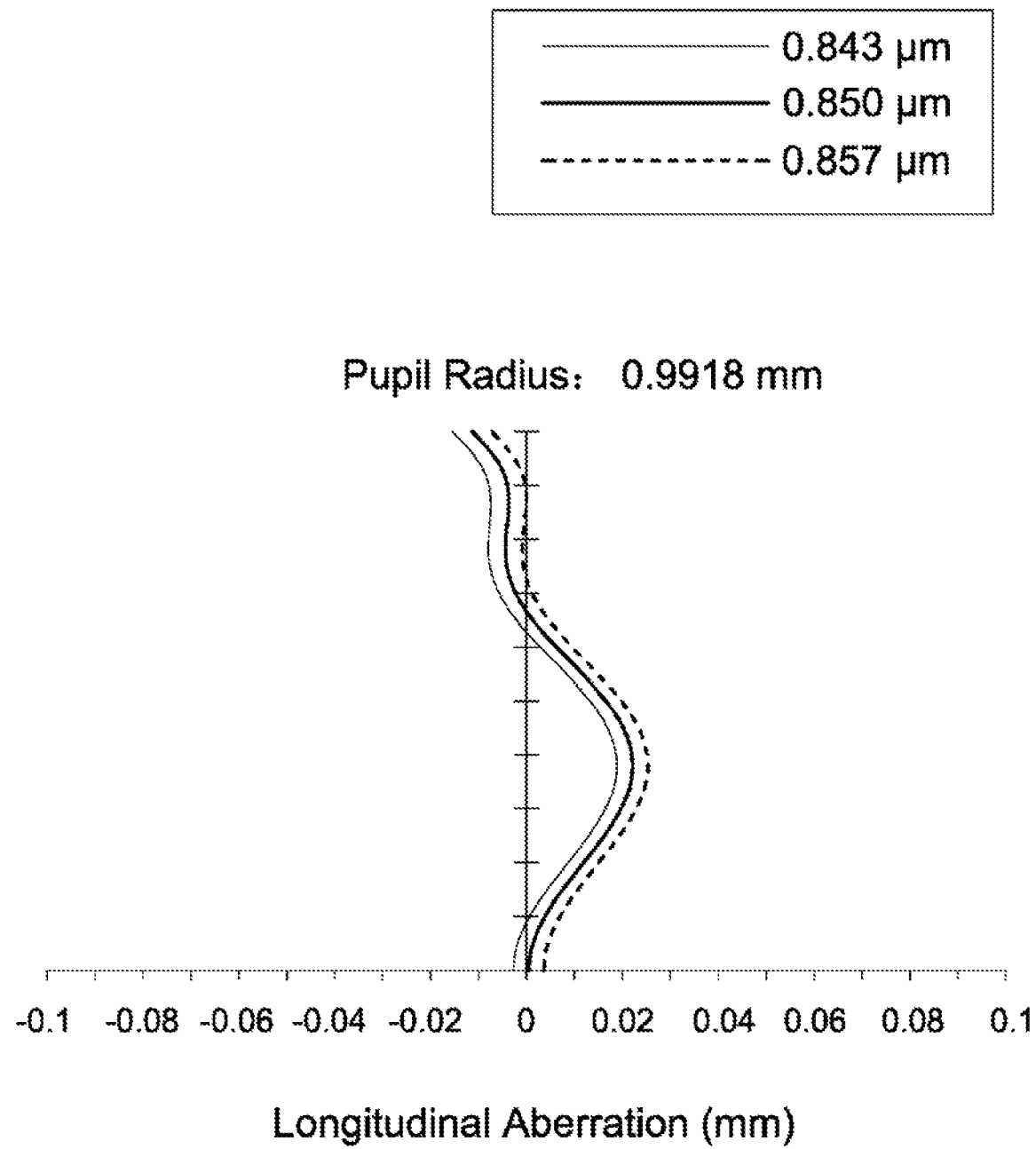
FIG. 12A, FIG. 12B, FIG. 12C, and FIG. 12D depict a longitudinal aberration diagram, a field curvature diagram, a distortion diagram, and a lateral color diagram of the lens assembly in accordance with the sixth embodiment of the invention, respectively.
Figure 12B:
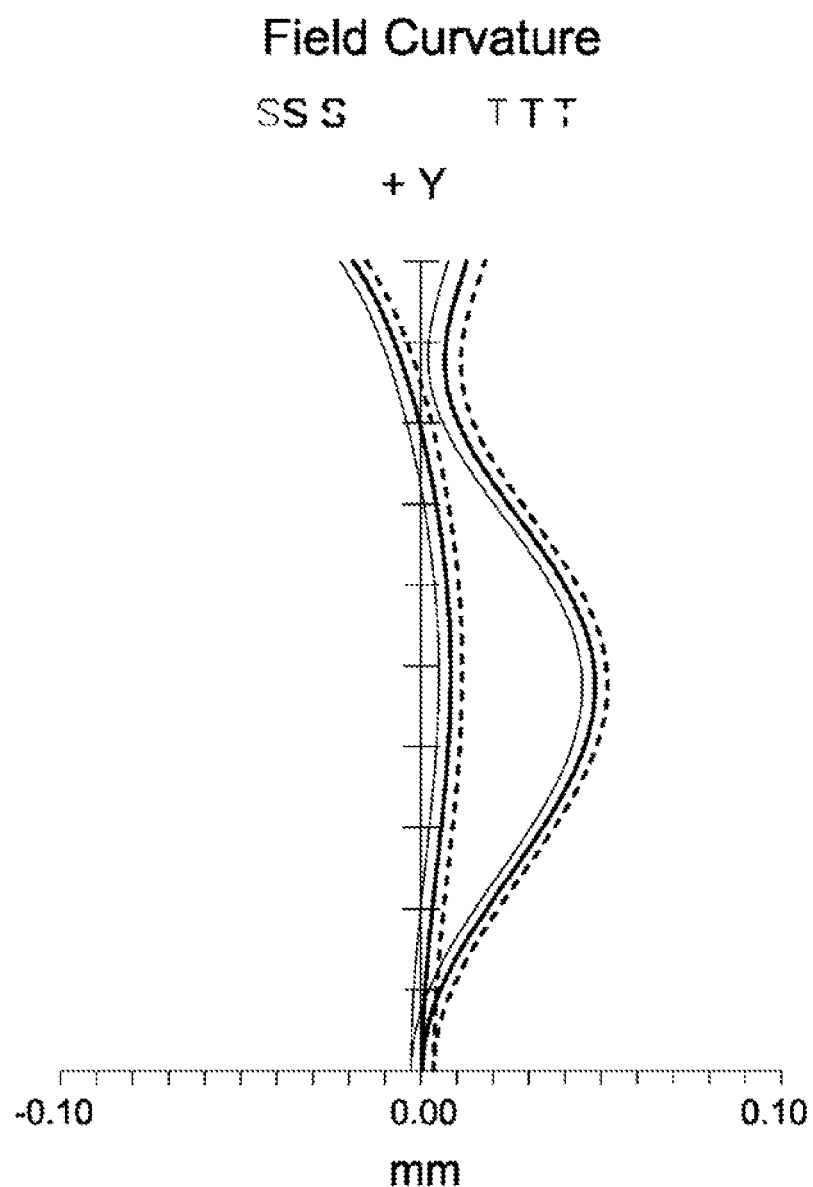
Figure 12C:
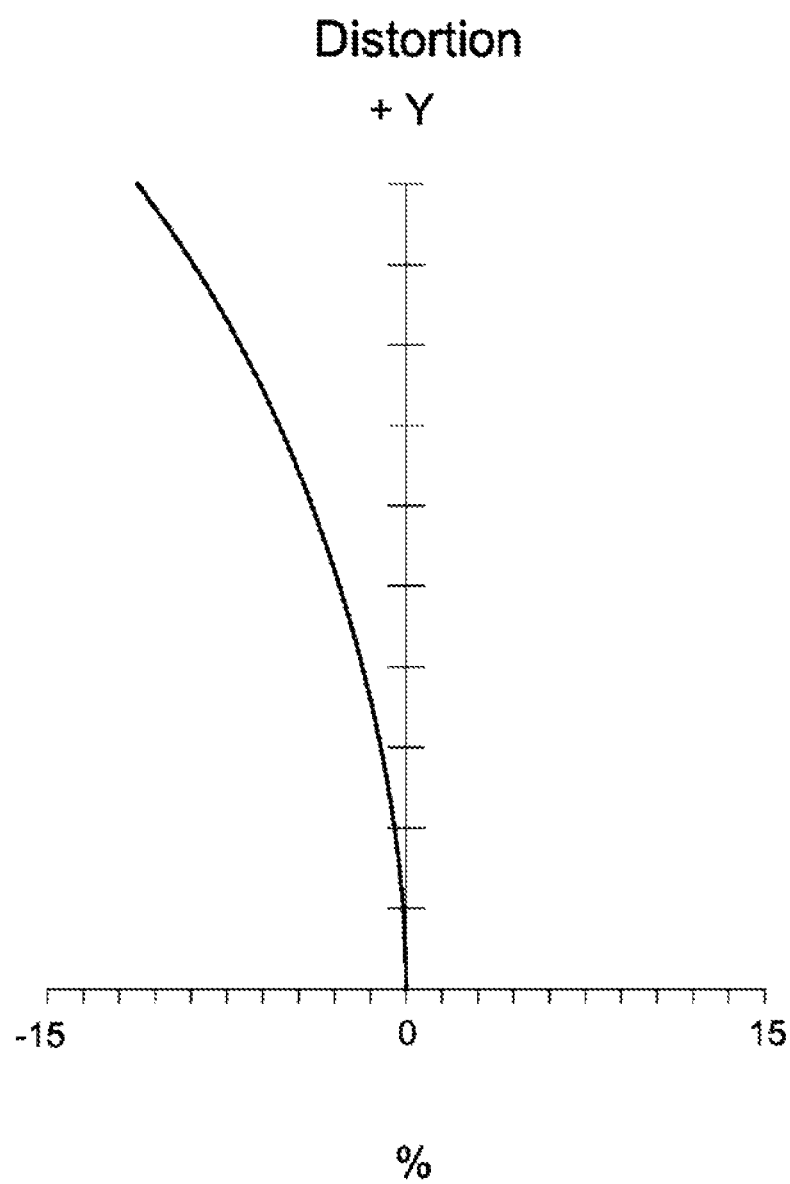
Figure 12D:
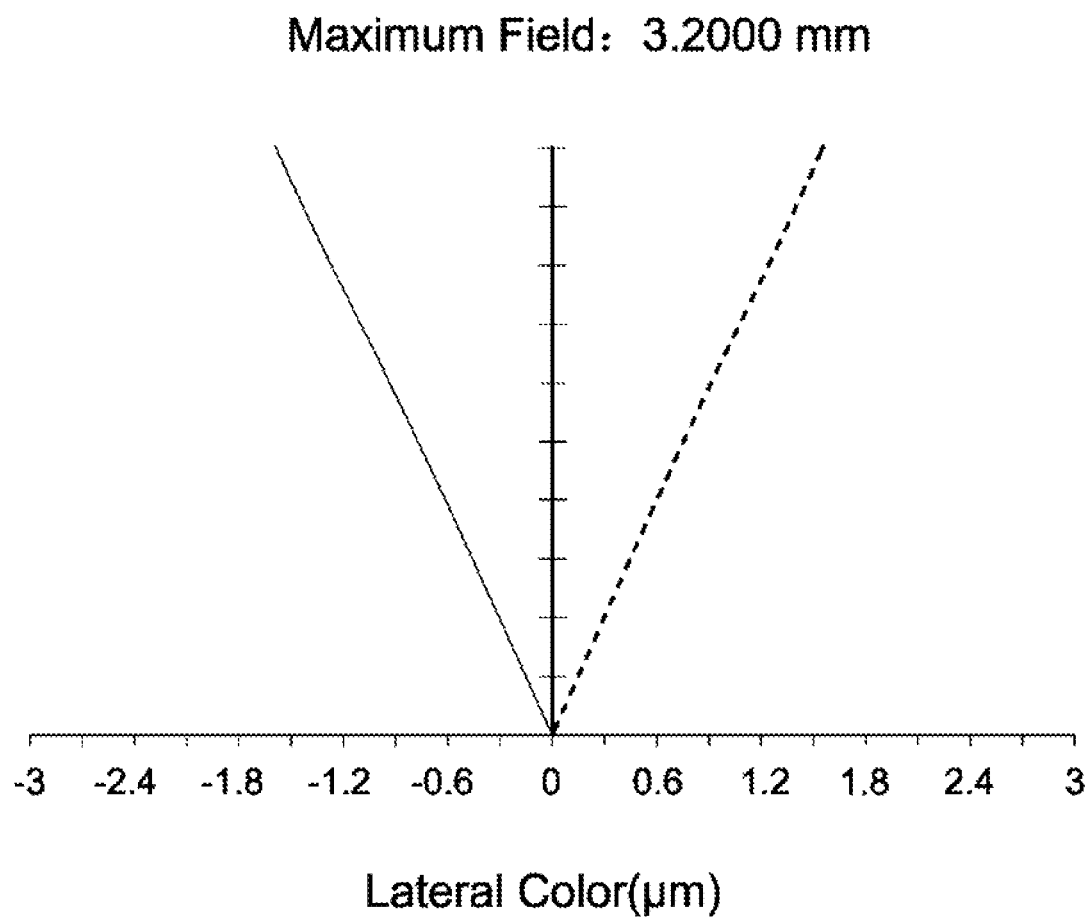

FIG. 7, FIG. 9, and FIG. 11 are lens layout diagrams of the lens assemblies in accordance with the fourth, fifth, and sixth embodiments of the invention, respectively.

The first lenses L41, L51, L61 are meniscus lenses with negative refractive power and made of glass material, wherein the object side surfaces S41, S51, S61 are convex surfaces, the image side surfaces S42, S52, S62 are concave surfaces, and both of the object side surfaces S41, S51, S61 and image side surfaces S42, S52, S62 are spherical surfaces.

The sixth lenses L46, L56, L66 are meniscus lenses with negative refractive power and made of plastic material, wherein both of the object side surfaces S43, S53, S63 and image side surfaces S44, S54, S64 are aspheric surfaces.

The second lenses L42, L52, L62 are biconvex lenses with positive refractive power and made of glass material, wherein the object side surfaces S45, S55, S66 are convex surfaces, the image side surfaces S46, S56, S67 are convex surfaces, and both of the object side surfaces S45, S55, S66 and image side surfaces S46, S56, S67 are spherical surfaces.

The third lenses L43, L53, L63 are meniscus lens with positive refractive power, wherein the object side surfaces S48, S58, S68 are concave surfaces which can reduce the light blocked by the optical filters OF4, OF5, OF6 reflecting to the object side surfaces S48, S58, S68 of the third lens L43, L53, L63 and then reflected back to produce ghost image, and the image side surfaces S49, S59, S69 are convex surfaces.

The seventh lenses L47, L57, L67 are meniscus lenses and made of plastic material, wherein both of the object side surfaces S410, S510, S610 and image side surfaces S411, S511, S611 are aspheric surfaces.

The fourth lenses L44, L54, L64 are with positive refractive power and can disperse lens sensitivity, wherein the image side surfaces S413, S513, S613 are convex surfaces.

The fifth lenses L45, L55, L65 are meniscus lenses with positive refractive power and made of glass material, wherein the object side surfaces S414, S514, S614 are convex surfaces, the image side surfaces S415, S515, S615 are concave surfaces, both of which can reduce the light blocked by the optical filters OF4, OF5, OF6 reflecting to the image side surfaces S415, S515, S615 of the fifth lenses L45, L55, L65 and then reflected back to produce ghost image focusing on the light source so that the ghost image overlaps the light source and is difficult to find, and both of the object side surfaces S414, S514, S614 and image side surfaces S415, S515, S615 are spherical surfaces.

The ghost image can be effectively reduced when the object side surface of the third lens is a concave surface, the fourth lens has positive refractive power, and the image side surface of the fifth lens is a concave surface.

In addition, the lens assemblies 4, 5, 6, satisfy at least one of the conditions (2), (4), and the following conditions (7)-(14):

$$65 \text{ mm}^2 \times \text{degrees} \leq ((f \times FOV \times \pi)/360) \times TTL \leq 70 \text{ mm}^2 \times \text{degrees}; \quad (7)$$

$$0.4 \leq L6T1/L6T2 \leq 0.8; \quad (8)$$

$$1.54 \leq Nd6 \leq 1.68; \quad (9)$$

$$1.54 \leq Nd7 \leq 1.68; \quad (10)$$

$$9 \text{ mm} \leq Nd2 \times f2 \leq 18 \text{ mm}; \quad (11)$$

$$25 \text{ mm} \leq Nd3 \times f3 \leq 55 \text{ mm}; \quad (12)$$

$$20 \text{ mm} \leq NdLG \times fLG \leq 40 \text{ mm}; \quad (13)$$

$$13 \text{ mm} \leq fAS2 \leq 40 \text{ mm}; \quad (14)$$

wherein f is an effective focal length of the lens assemblies 4, 5, 6 for the fourth to sixth embodiments, f2 is an effective focal length of the second lenses L42, L52, L62 for the fourth to sixth embodiments, f3 is an effective focal length of the third lenses L43, L53, L63 for the fourth to sixth embodiments, fLG is an effective focal length of the lenses L45, L55, L65 closest to the image side for the fourth to sixth embodiments, FOV is a field of view of the lens assemblies 4, 5, 6 for the fourth to sixth embodiments, TTL is an interval from the object side surfaces S41, S51, S61 of the first lenses L41, L51, L61 to image planes IMA4, IMA5, IMA6 along the optical axes OA4, OA5, OA6 for the fourth to sixth embodiments, L6T1 is a thickness of the sixth lenses L46, L56, L66 along the optical axes OA4, OA5, OA6 for the fourth to sixth embodiments, L6T2 is a periphery thickness of the sixth lenses L46, L56, L66 for the fourth to sixth embodiments, Nd6 is an index of refraction of the sixth lenses L46, L56, L66 for the fourth to sixth embodiments, Nd2 is an index of refraction of the second lenses L42, L52, L62 for the fourth to sixth embodiments, Nd3 is an index of refraction of the third lenses L43, L53, L63 for the fourth to sixth embodiments, Nd7 is an index of refraction of the seventh lenses L47, L57, L67 for the fourth to sixth embodiments, NdLG is an index of refraction of the lenses L45, L55, L65 closest to the image side for the fourth to sixth embodiments, and fAS2 is an effective focal length of the lenses L47, L57, L63 second away from the stops ST4, ST5, ST6 to the image side for the fourth to sixth embodiments. With the lens assemblies 4, 5, 6 satisfying at least one of the above conditions (2), (4), (7)-(14), the field of view can be effectively increased, the F-number can be effectively decreased, the resolution can be effectively increased, and the aberration can be effectively corrected.

When the condition (7): $65 \text{ mm}^2 \times \text{degrees} \leq ((f \times FOV \times \pi)/360) \times TTL \leq 70 \text{ mm}^2 \times \text{degrees}$ is satisfied, the distortion can be corrected effectively.

When the condition (8): $0.4 \leq L6T1/L6T2 \leq 0.8$ is satisfied, the processing cost of lenses can be decreased effectively.

When the condition (9): $1.54 \leq Nd6 \leq 1.68$ is satisfied, the spherical aberration can be corrected effectively.

When the condition (10): $1.54 \leq Nd7 \leq 1.68$ is satisfied, the spherical aberration can be corrected effectively.

When the condition (11): $9 \text{ mm} \leq Nd2 \times f2 \leq 18 \text{ mm}$ is satisfied, the influence of temperature on the offset of the back focal length can be reduced effectively.

When the condition (12): $25 \text{ mm} \leq Nd3 \times f3 \leq 55 \text{ mm}$ is satisfied, the field of curvature can be corrected effectively.

When the condition (13): $20 \text{ mm} \leq NdLG \times fLG \leq 40 \text{ mm}$ is satisfied, the field of curvature can be corrected effectively.

When the condition (14): $13 \text{ mm} \leq fAS2 \leq 40 \text{ mm}$ is satisfied, the distortion can be corrected effectively.

A detailed description of a lens assembly in accordance with a fourth embodiment of the invention is as follows. Referring to FIG. 7, the lens assembly 4 includes a first lens L41, a sixth lens L46, a second lens L42, a stop ST4, a third lens L43, a seventh lens L47, a fourth lens L44, a fifth lens L45, an optical filter OF4, and a cover glass CG4, all of which are arranged in order from an object side to an image side along an optical axis OA4. In operation, the light from the object side is imaged on an image plane IMA4.

According to subject matter previously described herein, wherein: the object side surface S43 of the sixth lens L46 is a concave surface and the image side surface S44 of the sixth lens L46 is a convex surface; both of the object side surface S48 and image side surface S49 of the third lens L43 are spherical surfaces; the seventh lens L47 is with positive refractive power, wherein the object side surface S410 is a convex surface and the image side surface S411 is a concave surface; the fourth lens L44 is a biconvex lens, wherein the object side surface S412 is a convex surface and both of the object side surface S412 and image side surface S413 are spherical surfaces; both of the object side surface S416 and image side surface S417 of the optical filter OF4 are plane surfaces, and both of the object side surface S418 and image side surface S419 of the cover glass CG4 are plane surfaces.

With the above design of the lenses, stop ST4, and at least one of the conditions (2), (4), (7)-(14) satisfied, the lens assembly 4 can have an effective increased field of view, an effective decreased F-number, an effective increased resolution, and an effective corrected aberration.

Table 10 shows the optical specification of the lens assembly 4 in FIG. 7.

TABLE 10

| Effective Focal Length = 2.53 mm F-number = 1.30 Total Lens Length = 19.08 mm Field of View = 160.40 degrees | | | | | | |
|---|---|---|---|---|---|---|
| Surface Number | Radius of Curvature (mm) | Thickness (mm) | Nd | Vd | Effective Focal Length (mm) | Remark |
| S41 | 10.62 | 0.79 | 2.1042 | 17.02 | −4.540 | L41 |
| S42 | 3.18 | 2.67 | | | | |
| S43 | −3.25 | 1.01 | 1.6397 | 23.53 | −10.691 | L46 |
| S44 | −7.12 | 0.06 | | | | |
| S45 | 19.00 | 1.19 | 2.1042 | 17.02 | 7.077 | L42 |
| S46 | −11.97 | 0.45 | | | | |
| S47 | ∞ | 1.30 | | | | ST4 |
| S48 | −7.22 | 1.49 | 1.8061 | 33.27 | 17.194 | L43 |
| S49 | −5.14 | 0.08 | | | | |

TABLE 10-continued

Effective Focal Length = 2.53 mm F-number = 1.30
Total Lens Length = 19.08 mm Field of View = 160.40 degrees

| Surface Number | Radius of Curvature (mm) | Thickness (mm) | Nd | Vd | Effective Focal Length (mm) | Remark |
|---|---|---|---|---|---|---|
| S410 | 7.16 | 2.76 | 1.5445 | 56 | 16.511 | L47 |
| S411 | 32.23 | 1.08 | | | | |
| S412 | 32.93 | 1.51 | 1.717 | 47.98 | 16.829 | L44 |
| S413 | −18.19 | 0.07 | | | | |
| S414 | 14.32 | 1.20 | 2.1042 | 17.02 | 17.916 | L45 |
| S415 | 55.88 | 1.45 | | | | |
| S416 | ∞ | 0.3 | 1.5168 | 64.1673 | | OF4 |
| S417 | ∞ | 0.57 | | | | |
| S418 | ∞ | 0.5 | 1.5168 | 64.1673 | | CG4 |
| S419 | ∞ | 0.6 | | | | |

The aspheric surface sag z of each aspheric lens in table 10 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D, and E are aspheric coefficients.

In the fourth embodiment, the conic constant k and the aspheric coefficients A, B, C, D, E of each aspheric lens are shown in Table 11.

TABLE 11

| Surface Number | k | A | B | C | D | E |
|---|---|---|---|---|---|---|
| S43 | 0 | 1.33E−02 | −4.17E−04 | 3.49E−05 | −1.27E−07 | 1.62E−07 |
| S44 | 0 | 1.04E−02 | −4.20E−04 | 4.23E−05 | −1.05E−06 | −8.05E−08 |
| S410 | 0 | 8.27E−04 | 5.43E−05 | −2.73E−06 | 6.56E−08 | 0 |
| S411 | 0 | 2.40E−03 | 8.53E−05 | 6.93E−07 | 1.27E−08 | 0 |

Table 12 shows the parameters and condition values for conditions (2), (4), (7)-(14) in accordance with the fourth embodiment of the invention. It can be seen from Table 12 that the lens assembly 4 of the fourth embodiment satisfies the conditions (2), (4), (7)-(14).

TABLE 12

| | | | | | |
|---|---|---|---|---|---|
| L1D | 5.66 mm | L6T1 | 1.01 mm | L6T2 | 1.72 mm |
| NdLG | 2.1042 | fLG | 17.916 mm | ((f × FOV × π)/360) × TTL | 67.47 mm² × degrees |
| L1D/R12 | 1.78 | L6T1/L6T2 | 0.59 | Nd6 | 1.6397 |
| Nd7 | 1.5445 | Nd2 × f2 | 14.89 mm | Nd3 × f3 | 31.05 mm |
| NdLG × fLG | 37.70 mm | fAS2 | 16.511 mm | fAS | 5.093 mm |
| ET5 | 2.11 mm | T5 | 2.76 mm | ΦST | 4.03 mm |
| ET5/T5 | 0.76 | ΦST/TTL | 0.21 | | |

In addition, the lens assembly 4 of the fourth embodiment can meet the requirements of optical performance as seen in FIGS. 8A-8D. It can be seen from FIG. 8A that the longitudinal aberration in the lens assembly 4 of the fourth embodiment ranges from −0.015 mm to 0.015 mm. It can be seen from FIG. 8B that the field curvature of tangential direction and sagittal direction in the lens assembly 4 of the fourth embodiment ranges from −0.04 mm to 0.03 mm. It can be seen from FIG. 8C that the distortion in the lens assembly 4 of the fourth embodiment ranges from −10% to 0%. It can be seen from FIG. 8D that the lateral color in the lens assembly 4 of the fourth embodiment ranges from −2.1 µm to 2.1 µm. It is obvious that the longitudinal aberration, the field curvature, the distortion, and the lateral color of the lens assembly 4 of the fourth embodiment can be corrected effectively. Therefore, the lens assembly 4 of the fourth embodiment is capable of good optical performance.

Referring to FIG. 9, the lens assembly 5 includes a first lens L51, a sixth lens L56, a second lens L52, a stop ST5, a third lens L53, a seventh lens L57, a fourth lens L54, a fifth lens L55, an optical filter OF5, and a cover glass CG5, all of which are arranged in order from an object side to an image side along an optical axis OA5. In operation, the light from the object side is imaged on an image plane IMA5.

According to subject matter previously described herein, wherein: the object side surface S53 of the sixth lens L56 is a concave surface and the image side surface S54 of the sixth lens L56 is a convex surface; both of the object side surface S58 and image side surface S59 of the third lens L53 are spherical surfaces; the seventh lens L57 is with positive refractive power, wherein the object side surface S510 is a convex surface and the image side surface S511 is a concave surface; the fourth lens L54 is a meniscus lens, wherein the object side surface S512 is a concave surface and both of the object side surface S512 and image side surface S513 are aspheric surfaces; both of the object side surface S516 and image side surface S517 of the optical filter OF5 are plane surfaces, and both of the object side surface S518 and image side surface S519 of the cover glass CG5 are plane surfaces.

With the above design of the lenses, stop ST5, and at least one of the conditions (2), (4), (7)-(14) satisfied, the lens assembly 5 can have an effective increased field of view, an effective decreased F-number, an effective increased resolution, and an effective corrected aberration.

Table 13 shows the optical specification of the lens assembly 5 in FIG. 9.

TABLE 13

Effective Focal Length = 2.55 mm F-number = 1.30
Total Lens Length = 19.00 mm Field of View = 160.40 degrees

| Surface Number | Radius of Curvature (mm) | Thickness (mm) | Nd | Vd | Effective Focal Length (mm) | Remark |
|---|---|---|---|---|---|---|
| S51 | 15.22 | 1.14 | 1.717 | 47.98 | −6.798 | L51 |
| S52 | 3.53 | 2.59 | | | | |
| S53 | −4.86 | 1.31 | 1.6328 | 23.34 | −9.436 | L56 |
| S54 | −33.49 | 0.44 | | | | |

TABLE 13-continued

Effective Focal Length = 2.55 mm F-number = 1.30
Total Lens Length = 19.00 mm Field of View = 160.40 degrees

| Surface Number | Radius of Curvature (mm) | Thickness (mm) | Nd | Vd | Effective Focal Length (mm) | Remark |
|---|---|---|---|---|---|---|
| S55 | 16.12 | 1.26 | 2.1042 | 17.02 | 7.818 | L52 |
| S56 | −16.33 | 0.08 | | | | |
| S57 | ∞ | 0.55 | | | | ST5 |
| S58 | −5.51 | 1.66 | 1.7859 | 43.93 | 24.776 | L53 |
| S59 | −4.84 | 0.08 | | | | |
| S510 | 7.02 | 1.85 | 1.5445 | 56 | 18.604 | L57 |
| S511 | 21.43 | 0.73 | | | | |
| S512 | −26.01 | 1.64 | 1.5445 | 56 | 19.698 | L54 |
| S513 | −7.69 | 0.56 | | | | |
| S514 | 8.54 | 1.61 | 2.1042 | 17.02 | 10.032 | L55 |
| S515 | 39.45 | 2.48 | | | | |
| S516 | ∞ | 0.3 | 1.5168 | 64.1673 | | OF5 |
| S517 | ∞ | 0.1 | | | | |
| S518 | ∞ | 0.5 | 1.5168 | 64.1673 | | CG5 |
| S519 | ∞ | 0.1 | | | | |

The definition of aspheric surface sag z of each aspheric lens in table 13 is the same as that of in Table 10, and is not described here again.

In the fifth embodiment, the conic constant k and the aspheric coefficients A, B, C, D, E of each aspheric lens are shown in Table 14.

TABLE 14

| Surface Number | k | A | B | C | D | E |
|---|---|---|---|---|---|---|
| S53 | 0 | 9.45E−03 | −5.45E−04 | 2.33E−05 | 7.49E−07 | −8.08E−08 |
| S54 | 0 | 1.05E−02 | −3.25E−04 | 4.03E−05 | 3.07E−06 | −2.82E−07 |
| S510 | 0 | 5.62E−04 | 3.41E−05 | −3.86E−06 | 7.51E−07 | −1.00E−08 |
| S511 | 0 | 1.14E−03 | 4.94E−05 | −5.78E−06 | 1.23E−06 | 3.94E−08 |
| S512 | 0 | 2.04E−03 | 1.42E−04 | 1.18E−05 | 4.82E−08 | −2.35E−08 |
| S513 | 0 | 2.57E−03 | 1.44E−04 | 1.29E−05 | −3.44E−08 | 2.65E−08 |

Table 15 shows the parameters and condition values for conditions (2), (4), (7)-(14) in accordance with the fifth embodiment of the invention. It can be seen from Table 15 that the lens assembly 5 of the fifth embodiment satisfies the conditions (2), (4), (7)-(14).

TABLE 15

| L1D | 6.29 mm | L6T1 | 1.31 mm | L6T2 | 2.03 mm |
|---|---|---|---|---|---|
| NdLG | 2.1042 | fLG | 10.032 mm | ((f × FOV × π)/360) × TTL | 67.91 mm² × degrees |
| L1D/R12 | 1.78 | L6T1/L6T2 | 0.65 | Nd6 | 1.6328 |
| Nd7 | 1.5445 | Nd2 × f2 | 16.45 mm | Nd3 × f3 | 44.25 mm |
| NdLG × fLG | 21.11 mm | fAS2 | 18.604 mm | fAS | 4.622 mm |
| ET5 | 1.299 mm | T5 | 1.848 mm | ΦST | 3.622 mm |
| ET5/T5 | 0.70 | ΦST/TTL | 0.19 | | |

In addition, the lens assembly 5 of the fifth embodiment can meet the requirements of optical performance as seen in FIGS. 10A-10D. It can be seen from FIG. 10A that the longitudinal aberration in the lens assembly 5 of the fifth embodiment ranges from −0.01 mm to 0.01 mm. It can be seen from FIG. 10B that the field curvature of tangential direction and sagittal direction in the lens assembly 5 of the fifth embodiment ranges from −0.04 mm to 0.01 mm. It can be seen from FIG. 10C that the distortion in the lens assembly 5 of the fifth embodiment ranges from −11% to 0%. It can be seen from FIG. 10D that the lateral color in the lens assembly 5 of the fifth embodiment ranges from −1.8 µm to 1.8 µm. It is obvious that the longitudinal aberration, the field curvature, the distortion, and the lateral color of the lens assembly 5 of the fifth embodiment can be corrected effectively. Therefore, the lens assembly 5 of the fifth embodiment is capable of good optical performance.

Referring to FIG. 11, the lens assembly 6 includes a first lens L61, a sixth lens L66, a stop ST6, a second lens L62, a third lens L63, a seventh lens L67, a fourth lens L64, a fifth lens L65, an optical filter OF6, and a cover glass CG6, all of which are arranged in order from an object side to an image side along an optical axis OA6. In operation, the light from the object side is imaged on an image plane IMA6.

According to subject matter previously described herein, wherein: the object side surface S63 of the sixth lens L66 is a convex surface and the image side surface S64 of the sixth lens L66 is a concave surface; both of the object side surface S68 and image side surface S69 of the third lens L63 are aspheric surfaces; the seventh lens L67 is with negative refractive power, wherein the object side surface S610 is a concave surface and the image side surface S611 is a convex surface; the fourth lens L64 is a meniscus lens, wherein the object side surface S612 is a concave surface and both of the object side surface S612 and image side surface S613 are aspheric surfaces; both of the object side surface S616 and image side surface S617 of the optical filter OF6 are plane surfaces, and both of the object side surface S618 and image side surface S619 of the cover glass CG6 are plane surfaces.

With the above design of the lenses, stop ST6, and at least one of the conditions (2), (4), (7)-(14) satisfied, the lens assembly 6 can have an effective increased field of view, an effective decreased F-number, an effective increased resolution, and an effective corrected aberration.

Table 16 shows the optical specification of the lens assembly 6 in FIG. 11.

TABLE 16

Effective Focal Length = 2.57 mm F-number = 1.30
Total Lens Length = 18.46 mm Field of View = 160.70 degrees

| Surface Number | Radius of Curvature (mm) | Thickness (mm) | Nd | Vd | Effective Focal Length (mm) | Remark |
|---|---|---|---|---|---|---|
| S61 | 13.85 | 1.32 | 1.5688 | 56.04 | −8.888 | L61 |
| S62 | 3.54 | 1.74 | | | | |
| S63 | 19.59 | 1.00 | 1.5365 | 55.98 | −7.113 | L66 |

TABLE 16-continued

Effective Focal Length = 2.57 mm  F-number = 1.30
Total Lens Length = 18.46 mm  Field of View = 160.70 degrees

| Surface Number | Radius of Curvature (mm) | Thickness (mm) | Nd | Vd | Effective Focal Length (mm) | Remark |
|---|---|---|---|---|---|---|
| S64 | 3.10 | 1.29 | | | | |
| S65 | ∞ | −0.04 | | | | ST6 |
| S66 | 32.00 | 2.16 | 2.1042 | 17.02 | 4.570 | L62 |
| S67 | −5.50 | 0.08 | | | | |
| S68 | −4.18 | 1.34 | 1.5445 | 56 | 34.434 | L63 |
| S69 | −3.79 | 0.05 | | | | |
| S610 | −5.99 | 0.85 | 1.6613 | 20.38 | −91.508 | L67 |
| S611 | −7.04 | 0.07 | | | | |
| S612 | −17.86 | 2.56 | 1.5445 | 56 | 10.950 | L64 |
| S613 | −4.65 | 0.08 | | | | |
| S614 | 13.00 | 2.26 | 2.1042 | 17.02 | 17.266 | L65 |
| S615 | 41.00 | 2.70 | | | | |
| S616 | ∞ | 0.3 | 1.5168 | 64.1673 | | OF6 |
| S617 | ∞ | 0.1 | | | | |
| S618 | ∞ | 0.5 | 1.5168 | 64.1673 | | CG6 |
| S619 | ∞ | 0.1 | | | | |

The definition of aspheric surface sag z of each aspheric lens in table 16 is the same as that of in Table 10, and is not described here again.

In the sixth embodiment, the conic constant k and the aspheric coefficients A, B, C, D, E of each aspheric lens are shown in Table 17.

TABLE 17

| Surface Number | k | A | B | C | D | E |
|---|---|---|---|---|---|---|
| S63 | 0 | 2.64E−03 | 1.37E−05 | −8.42E−05 | 1.16E−05 | −5.33E−07 |
| S64 | 0 | 1.59E−02 | −1.41E−03 | 1.66E−03 | −5.04E−04 | 1.10E−04 |
| S68 | 0 | 3.48E−03 | 1.96E−03 | −7.44E−04 | 1.50E−04 | −9.23E−06 |
| S69 | 0 | −5.86E−04 | −6.06E−04 | 2.36E−04 | −4.53E−05 | 5.06E−06 |
| S610 | 0 | −3.40E−04 | −1.16E−04 | 1.04E−05 | 3.97E−07 | 3.63E−08 |
| S611 | 0 | 1.50E−03 | 9.12E−05 | 1.03E−06 | −1.01E−07 | −1.03E−07 |
| S612 | 0 | −1.47E−03 | −1.22E−04 | −6.51E−06 | −9.92E−07 | 2.23E−08 |
| S613 | 0 | −4.98E−04 | 1.64E−05 | −4.93E−06 | −3.12E−08 | −1.82E−09 |

Table 18 shows the parameters and condition values for conditions (2), (4), (7)-(14) in accordance with the sixth embodiment of the invention. It can be seen from Table 18 that the lens assembly 6 of the sixth embodiment satisfies the conditions (2), (4), (7)-(14).

TABLE 18

| L1D | 6.26 mm | L6T1 | 1.00 mm | L6T2 | 1.52 mm |
|---|---|---|---|---|---|
| NdLG | 2.1042 | fLG | 17.266 mm | ((f × FOV × π)/360) × TTL | 66.54 mm² × degrees |
| L1D/R12 | 1.77 | L6T1/L6T2 | 0.66 | Nd6 | 1.5365 |
| Nd7 | 1.6613 | Nd2 × f2 | 9.62 mm | Nd3 × f3 | 53.18 mm |
| NdLG × fLG | 36.33 mm | fAS2 | 34.434 mm | fAS | 3.774 mm |
| ET5 | 1.048 mm | T5 | 0.846 mm | ΦST | 3.146 mm |
| ET5/T5 | 1.24 | ΦST/TTL | 0.17 | | |

In addition, the lens assembly 6 of the sixth embodiment can meet the requirements of optical performance as seen in FIGS. 12A-12D. It can be seen from FIG. 12A that the longitudinal aberration in the lens assembly 6 of the sixth embodiment ranges from −0.02 mm to 0.03 mm. It can be seen from FIG. 12B that the field curvature of tangential direction and sagittal direction in the lens assembly 6 of the sixth embodiment ranges from −0.03 mm to 0.05 mm. It can be seen from FIG. 12C that the distortion in the lens assembly 6 of the sixth embodiment ranges from −12% to 0%. It can be seen from FIG. 12D that the lateral color in the lens assembly 6 of the sixth embodiment ranges from −1.6 µm to 1.6 µm. It is obvious that the longitudinal aberration, the field curvature, the distortion, and the lateral color of the lens assembly 6 of the sixth embodiment can be corrected effectively. Therefore, the lens assembly 6 of the sixth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
   a first lens which is a meniscus lens with negative refractive power;
   a second lens which is with positive refractive power and comprises a convex surface facing an image side;
   a third lens which is a meniscus lens with positive refractive power;
   a fourth lens which is with positive refractive power; and
   a fifth lens which is with refractive power and comprises a convex surface facing an object side;
   wherein the first lens, the second lens, the third lens, the fourth lens, and the fifth lens are arranged in order from the object side to the image side along an optical axis;
   wherein the lens assembly satisfies:

$0.1 < \Phi ST/TTL < 0.5;$ wherein ΦST is an aperture diameter of a stop and TTL is an interval from an object side surface of the first lens to an image plane along the optical axis.

2. The lens assembly as claimed in claim 1, wherein:
   the first lens comprises a convex surface facing the object side and a concave surface facing the image side;
   the second lens further comprises a concave surface facing the object side; and
   the third lens comprises a concave surface facing the object side and a convex surface facing the image side.

3. The lens assembly as claimed in claim 2, wherein:
   the fourth lens is a meniscus lens and comprises a convex surface facing the object side and a concave surface facing the image side; and
   the fifth lens is a biconvex lens with positive refractive power and further comprises a convex surface facing the image side.

4. The lens assembly as claimed in claim 1, wherein the stop is disposed between the second lens and the third lens.

5. The lens assembly as claimed in claim 1, wherein the fifth lens is a single lens and an air gap is disposed between the fourth lens and the fifth lens.

6. The lens assembly as claimed in claim 1, wherein the lens assembly satisfies:

$-3 < f1/f < -1.5;$ $0.5 < ET5/T5 < 1.5;$ wherein f1 is an effective focal length of the first lens, f is an effective focal length of the lens assembly, ET5 is a periphery thickness of the fifth lens, and T5 is a thickness of the fifth lens along the optical axis.

7. The lens assembly as claimed in claim 1, further comprising a sixth lens and a seventh lens, wherein:
the sixth lens is a meniscus lens with negative refractive power and disposed between the first lens and the second lens;
the seventh lens is a meniscus lens and disposed between the third lens and the fourth lens; and
the fifth lens is a meniscus lens with positive refractive power and further comprises a concave surface facing the image side.

8. The lens assembly as claimed in claim 7, wherein:
the first lens comprises a convex surface facing the object side and a concave surface facing the image side;
the second lens further comprises another convex surface facing the object side;
the third lens comprises a concave surface facing the object side and a convex surface facing the image side; and
the fourth lens comprises a convex surface facing the image side.

9. The lens assembly as claimed in claim 8, wherein:
the sixth lens comprises a concave surface facing the object side and a convex surface facing the image side; and
the seventh lens is with positive refractive power and comprises a convex surface facing the object side and a concave surface facing the image side.

10. The lens assembly as claimed in claim 9, wherein the fourth lens further comprises another convex surface facing the object side.

11. The lens assembly as claimed in claim 9, wherein the fourth lens further comprises a concave surface facing the object side.

12. The lens assembly as claimed in claim 8, wherein:
the sixth lens comprises a convex surface facing the object side and a concave surface facing the image side; and
the seventh lens is with negative refractive power and comprises a concave surface facing the object side and a convex surface facing the image side.

13. The lens assembly as claimed in claim 12, wherein the fourth lens further comprises a concave surface facing the object side.

14. The lens assembly as claimed in claim 7, wherein the lens assembly satisfies at least one of following conditions:

$65\ mm^2 \times degrees \le ((f \times FOV \times \pi)/360) \times TTL \le 70\ mm^2 \times degrees;$ $L1D/R12 \le 1.8;$ $0.4 \le L6T1/L6T2 \le 0.8;$ $1.54 \le Nd6 \le 1.68;$ $1.54 \le Nd7 \le 1.68;$ $9\ mm \le Nd2 \times f2 \le 18\ mm;$ wherein f is an effective focal length of the lens assembly, FOV is a field of view of the lens assembly, TTL is an interval from an object side surface of the first lens to an image plane along the optical axis, L1D is an effective optical diameter of an image side surface of the first lens, R12 is a radius of curvature of the image side surface of the first lens, L6T1 is a thickness of the sixth lens along the optical axis, L6T2 is a periphery thickness of the sixth lens, Nd6 is an index of refraction of the sixth lens, Nd7 is an index of refraction of the seventh lens, Nd2 is an index of refraction of the second lens, and f2 is an effective focal length of the second lens.

15. The lens assembly as claimed in claim 7, wherein the stop is disposed between the sixth lens and the third lens and the lens assembly satisfies at least one of following conditions:

$25\ mm \le Nd3 \times f3 \le 55\ mm;$ $20\ mm \le NdLG \times fLG \le 40\ mm;$ $13\ mm \le fAS2 \le 40\ mm;$ $3.5\ mm \le fAS \le 5.5\ mm;$ wherein Nd3 is an index of refraction of the third lens, f3 is an effective focal length of the third lens, NdLG is an index of refraction of the lens closest to the image side, fLG is an effective focal length of the lens closest to the image side, fAS2 is an effective focal length of the lens second away from the stop to the image side, and fAS is an effective focal length of a combination of all lenses between the stop and the image side.

16. A lens assembly comprising:
a first lens which is a meniscus lens with negative refractive power;
a second lens which is with positive refractive power and comprises a convex surface facing an image side;
a third lens which is a meniscus lens with positive refractive power;
a fourth lens which is with positive refractive power; and
a fifth lens which is with refractive power;
wherein the first lens, the second lens, the third lens, the fourth lens, and the fifth lens are arranged in order from an object side to the image side along an optical axis;
wherein the lens assembly satisfies at least one of following conditions:

$0.5 < ET5/T5 < 1.5;$ $65\ mm^2 \times degrees \le ((f \times FOV \times \pi)/360) \times TTL \le 70\ mm^2 \times degrees;$ Wherein ET5 is a periphery thickness of the fifth lens, T5 is a thickness of the fifth lens along the optical axis, f is an effective focal length of the lens assembly, FOV is a field of view of the lens assembly, and TTL is an interval from an object side surface of the first lens to an image plane along the optical axis.

17. The lens assembly as claimed in claim 16, further comprising a stop disposed between the second lens and the third lens, wherein:
the first lens comprises a convex surface facing the object side and a concave surface facing the image side;
the second lens is a meniscus lens and further comprises a concave surface facing the object side;
the third lens comprises a concave surface facing the object side and a convex surface facing the image side;

the fourth lens is a biconvex lens and comprises a convex surface facing the object side and another convex surface facing the image side, and the fifth lens is a meniscus lens and comprises a concave surface facing the object side and a convex surface facing the image side.

18. The lens assembly as claimed in claim 17, wherein the lens assembly satisfies at least one of following conditions:

$0.1 < \Phi ST/TTL < 0.5;$ $-3 < f1/f < -1.5;$ $0.5 < ET5/T5 < 1.5;$ $0.3 < \Phi 2/\Phi 3 < 0.8;$ wherein ΦST is an aperture diameter of the stop, TTL is an interval from an object side surface of the first lens to an image plane along the optical axis, f1 is an effective focal length of the first lens, f is an effective focal length of the lens assembly, ET5 is a periphery thickness of the fifth lens, T5 is a thickness of the fifth lens along the optical axis, 2 is a maximum effective optical diameter of the second lens, and Φ3 is a maximum effective optical diameter of the third lens.

19. The lens assembly as claimed in claim 16, wherein:

the fifth lens is with negative refractive power; and the lens assembly satisfies:

$0.3 < \Phi 2/\Phi 3 < 0.8;$ wherein Φ2 is a maximum effective optical diameter of the second lens, and Φ3 is a maximum effective optical diameter of the third lens.

\* \* \* \* \*